(12) United States Patent
Cholas et al.

(10) Patent No.: US 9,282,365 B2
(45) Date of Patent: *Mar. 8, 2016

(54) PREMISES GATEWAY APPARATUS AND METHODS FOR USE IN A CONTENT DISTRIBUTION NETWORK

(71) Applicant: TIME WARNER CABLE ENTERPRISES LLC, New York, NY (US)

(72) Inventors: Chris Cholas, Frederick, CO (US); William L. Helms, Longmont, CO (US); Louis Williamson, Denver, CO (US); Jeffrey P. Markley, Superior, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/612,032

(22) Filed: Feb. 2, 2015

(65) Prior Publication Data

US 2015/0215669 A1 Jul. 30, 2015

Related U.S. Application Data

(63) Continuation of application No. 13/888,210, filed on May 6, 2013, now Pat. No. 8,949,919, which is a continuation of application No. 13/118,192, filed on May 27, 2011, now Pat. No. 8,438,607, which is a continuation of application No. 11/818,236, filed on Jun. 13, 2007, now Pat. No. 7,954,131.

(51) Int. Cl.
| | |
|---|---|
| H04N 7/18 | (2006.01) |
| H04N 21/436 | (2011.01) |
| H04N 21/4147 | (2011.01) |
| H04N 21/426 | (2011.01) |
| H04N 21/443 | (2011.01) |
| H04N 21/61 | (2011.01) |
| H04N 21/643 | (2011.01) |
| H04L 12/28 | (2006.01) |

(Continued)

(52) U.S. Cl.
CPC ...... *H04N 21/43615* (2013.01); *H04L 12/2856* (2013.01); *H04N 21/4147* (2013.01); *H04N 21/42676* (2013.01); *H04N 21/438* (2013.01); *H04N 21/4433* (2013.01); *H04N 21/4627* (2013.01); *H04N 21/6118* (2013.01); *H04N 21/6168* (2013.01); *H04N 21/64322* (2013.01)

(58) Field of Classification Search
CPC .................. H04N 21/463615; H04N 21/4147; H04N 21/42676
See application file for complete search history.

(56) References Cited

U.S. PATENT DOCUMENTS

| | | |
|---|---|---|
| 5,557,319 A | 9/1996 | Gurusami et al. |
| 5,765,097 A | 6/1998 | Dail |

(Continued)

*Primary Examiner* — Hunter B Lonsberry
(74) *Attorney, Agent, or Firm* — Gazdzinski & Associates, PC

(57) ABSTRACT

Apparatus and methods for premises gateway functions that integrate or unify functions typically distributed across multiple devices within a content-based network. In one embodiment, the out-of-band (OOB) signaling functionality normally provided in each of a set-top-box (STB) and digital video recorder (DVR) are unified into a common OOB (e.g., DOCSIS) capable premises gateway device, thereby obviating OOB tuners and related components from each device. In another variant, the premises gateway is adapted for all-IP operation, such as for use with IP-based computers and IP set-top boxes, etc. Fully unified variants are also disclosed, wherein the DVR and/or STB functions are physically integrated within the premises gateway.

20 Claims, 21 Drawing Sheets

(51) Int. Cl.
*H04N 21/438* (2011.01)
*H04N 21/4627* (2011.01)

(56) References Cited

U.S. PATENT DOCUMENTS

| | | | |
|---|---|---|---|
| 5,864,672 A | 1/1999 | Bodeep et al. |
| 6,317,884 B1 | 11/2001 | Eames et al. |
| 6,381,248 B1 | 4/2002 | Lu |
| 6,396,531 B1 | 5/2002 | Gerszberg et al. |
| 6,546,016 B1 | 4/2003 | Gerszberg et al. |
| 6,577,414 B1 | 6/2003 | Feldman et al. |
| 6,711,742 B1 | 3/2004 | Kishi et al. |
| 6,765,931 B1 | 7/2004 | Rabenko et al. |
| 6,889,385 B1 | 5/2005 | Rakib et al. |
| 6,912,209 B1 | 6/2005 | Thi et al. |
| 6,931,018 B1 | 8/2005 | Fisher |
| 6,978,474 B1 | 12/2005 | Sheppard et al. |
| 6,985,492 B1 | 1/2006 | Thi et al. |
| 7,023,868 B2 | 4/2006 | Rabenko et al. |
| 7,184,664 B2 | 2/2007 | Farmer et al. |
| 7,231,655 B2 | 6/2007 | Brooks |
| 7,257,106 B2 | 8/2007 | Chen et al. |
| 7,333,483 B2 | 2/2008 | Zhao et al. |
| 7,366,415 B2 | 4/2008 | Lee et al. |
| 7,382,786 B2 | 6/2008 | Chen et al. |
| 7,529,485 B2 | 5/2009 | Farmer et al. |
| 7,584,490 B1 | 9/2009 | Schlack |
| 7,596,801 B2 | 9/2009 | Wall et al. |
| 7,602,820 B2 | 10/2009 | Helms et al. |
| 7,657,919 B2 | 2/2010 | Alsobrook et al. |
| 7,701,954 B2 | 4/2010 | Rabenko et al. |
| 7,954,131 B2 | 5/2011 | Cholas et al. |
| 8,180,222 B2 | 5/2012 | Sucharczuk et al. |
| 8,266,429 B2 | 9/2012 | Helms et al. |
| 8,312,267 B2 | 11/2012 | Helms et al. |
| 8,347,341 B2 | 1/2013 | Markley et al. |
| 8,520,850 B2 | 8/2013 | Helms et al. |
| 8,738,607 B2 * | 5/2014 | Dettinger et al. ............ 707/713 |
| 8,949,919 B2 * | 2/2015 | Cholas et al. ................ 725/112 |
| 2002/0038459 A1 | 3/2002 | Talmola et al. |
| 2002/0061012 A1 | 5/2002 | Thi et al. |
| 2003/0005453 A1 | 1/2003 | Rodriguez et al. |
| 2003/0056217 A1 | 3/2003 | Brooks |
| 2003/0120742 A1 | 6/2003 | Ohgami et al. |
| 2003/0217365 A1 | 11/2003 | Caputo |
| 2004/0133920 A1 | 7/2004 | Kim et al. |
| 2005/0055729 A1 | 3/2005 | Atad et al. |
| 2005/0165899 A1 | 7/2005 | Mazzola |
| 2006/0041915 A1 | 2/2006 | Dimitrova et al. |
| 2006/0047957 A1 | 3/2006 | Helms et al. |
| 2006/0117379 A1 | 6/2006 | Bennett et al. |
| 2006/0130113 A1 | 6/2006 | Carlucci et al. |
| 2006/0136968 A1 | 6/2006 | Han et al. |
| 2006/0156392 A1 | 7/2006 | Baugher et al. |
| 2006/0218604 A1 | 9/2006 | Riedl et al. |
| 2007/0022459 A1 | 1/2007 | Gaebel et al. |
| 2007/0025372 A1 | 2/2007 | Brenes et al. |
| 2007/0121578 A1 | 5/2007 | Annadata et al. |
| 2007/0121678 A1 | 5/2007 | Brooks et al. |
| 2007/0153820 A1 | 7/2007 | Gould |
| 2007/0154041 A1 | 7/2007 | Beauchamp |
| 2007/0217436 A1 | 9/2007 | Markley et al. |
| 2007/0226365 A1 | 9/2007 | Hildreth et al. |
| 2007/0250900 A1 | 10/2007 | Marcuvitz |
| 2007/0276925 A1 | 11/2007 | La Joie et al. |
| 2007/0294738 A1 | 12/2007 | Kuo et al. |
| 2008/0098212 A1 | 4/2008 | Helms et al. |
| 2008/0098450 A1 | 4/2008 | Wu et al. |
| 2008/0112405 A1 | 5/2008 | Cholas et al. |
| 2008/0120667 A1 | 5/2008 | Zaltsman |
| 2010/0191525 A1 | 7/2010 | Rabenko et al. |
| 2011/0002245 A1 | 1/2011 | Wall et al. |
| 2011/0103374 A1 | 5/2011 | Lajoie et al. |
| 2011/0145871 A1 | 6/2011 | Lee et al. |
| 2013/0125194 A1 | 5/2013 | Finkelstein et al. |

* cited by examiner

PREMISES GATEWAY APPARATUS AND METHODS FOR USE IN A CONTENT DISTRIBUTION NETWORK

This application is a continuation of and claims priority to co-owned, co-pending U.S. patent application Ser. No. 13/888,210 filed on May 6, 2013 and issuing as U.S. Patent No. 8,949,919 on Feb. 3, 2015, which is a continuation of and claims priority to U.S. patent application Ser. No. 13/118,192 filed on May 27, 2011 of the same title, and which issued as U.S. Patent No. 8,438,607 on May 7, 2013, which is a continuation of and claims priority to U.S. patent application Ser. No. 11/818,236 filed Jun. 13, 2007 of the same title now issued as U.S. Pat. No. 7,954,131 on May 31, 2011, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of content and/or data delivery over a network. More particularly, the present invention is related to apparatus and methods for distributing programming content, media, data and other information services via apparatus disposed on a user premises (e.g., residence, enterprise, etc.).

2. Description of Related Technology

Recent advances in digital information processing have made a range of services and functions available for delivery to consumers at their premises for very reasonable prices or subscription fees. These services and functions include digital broadcast programming (movies, etc.), digital video-on-demand (VOD), personal video recorder (PVR), Internet Protocol television (IPTV), digital media playback and recording, as well high speed internet access and IP-based telephony (e.g., VoIP). Other services available to network users include access to and recording of digital music (e.g., MP3 files), as well local area networking (including wire-line and wireless local area networks) for distributing these services throughout the user's premises, and beyond.

Currently, in the context of content-based networks, many of these services are provided and delivered to the user via a variety of different equipment environments including, inter alia, cable modems and computers, cable set-top boxes, and digital video recorders (DVRs). This unfortunately presents the user with a somewhat heterogeneous mixture of substantially separate hardware and software environments.

Some improvements in digital service integration have been made over time. For example, cable system subscribers (such as those of the Assignee hereof) can now access VOD, PVR, PPV and broadcast services simultaneously, as well a Internet access via cable modem, and even digital telephony (e.g., VoIP).

A variety of residential or home "gateway" devices for use with cable television networks and that integrate various functions are disclosed in the prior art. For example, U.S. Pat. No. 5,557,319 to Gurusami, et al. issued Sep. 17, 1996 entitled "Subscriber return system for CATV full service networks" discloses a subscriber premise local bus (SPLB) is connected to a cable drop from a wide-band 2-way network through a gateway device providing frequency conversion and blocking of certain frequencies used in the subscriber premises local bus (SPLB). Service channels to the consumer are provided in a first band such as 54 to 750 MHZ, carried unchanged over the SPLB. Return signals from the subscriber are generated at subscriber devices, such as TV, computers, etc. at, or are up-converted to, signals in a higher frequency band, such as 900 to 950 Mhz, for transmission on the SPLB to the gateway device where they are down-converted to frequencies below 54 Mhz for transmission over the network. A band-pass or other filter may block at least some of the lower frequencies from carrying over from the SPLB to the cable drop or 2-way network.

U.S. Pat. No. 6,317,884 to Eames, et al. issued Nov. 13, 2001 entitled "Video, data and telephony gateway" discloses a residential gateway for distributing video, data and telephony services. The gateway has a MPEG bus connected from a network interface module to a first and a second video processors. A microprocessor controls the first and second video processors by sending control signals across a control bus.

U.S. Pat. No. 6,396,531 to Gerszberg, et al. issued May 28, 2002 entitled "Set top integrated visionphone user interface having multiple menu hierarchies" discloses a system architecture for bypassing a local exchange carrier that comprises an intelligent terminal, a residential gateway coupled to the terminal, a cable facility management platform terminating a twisted pair or coaxial cable facility and a network service platform. The platform serves both a cable headend and a telephone DSL network to enable a single service provider to provide different information content services independent of how a user actually receives the services. The integrated residence gateway is coupled to either or both of the coaxial cable or twisted pair and distributes the bandwidth facilities available over either service vehicle to customer devices including the set top box.

U.S. Pat. No. 6,546,016 to Gerszberg, et al. issued Apr. 8, 2003 entitled "Coaxial cable/twisted pair cable telecommunications network architecture" discloses a system architecture for bypassing a local exchange carrier comprises an intelligent terminal, a residential gateway coupled to the terminal, a cable facility management platform terminating a twisted pair or coaxial cable facility and a network service platform. The twisted pair and/or coaxial cable fed, integrated residence gateway controlled intelligent terminal or set-top device provides a plurality of enhanced services. One necessary service is lifeline service which may be provided over the coaxial cable via a cable modem of the integrated residence gateway, over the twisted pair facility or via wireless means. The integrated residence gateway is coupled to either or both of the coaxial cable or twisted pair and distributes the bandwidth facilities available over either service vehicle to customer devices including the set top box.

U.S. Pat. No. 6,711,742 to Kishi, et al. issued Mar. 23, 2004 entitled "Cable modem system using CATV transmission path" discloses a cable modem system prevents an up-link noise from entering a cable so as to efficiently use the bandwidth of a CATV transmission path. The cable modem system performs data communication using the transmission path of a cable television system which includes a cable television station apparatus and a plurality of subscriber units connected to each other by the transmission path. A gateway apparatus receives an original data signal supplied by one of the subscriber units via a telephone network. The gateway apparatus converts the original data signal into a converted data signal so that the converted data signal complies with a protocol corresponding to a destination address included in the original data signal. The gateway apparatus sends the converted data signal to the cable television station apparatus via the transmission path. A line end terminal unit is provided in the cable television station apparatus so as to receive the converted data signal sent from the gateway apparatus. The line end terminal unit restores the converted data signal to the original data signal.

U.S. Pat. No. 6,931,018 to Fisher issued Aug. 16, 2005 entitled "Local network router and method of routing IP data packets" discloses a local network router that learns to route IP traffic among customer premises equipment on a local network rather than permitting the IP traffic to be routed through a broadband cable network and selected internet service provider (ISP) to the internet. The local network router dynamically generates a routing table from address resolution protocol (ARP) packets exchanged between the CPE and the external network. For each IP data packet received from a CPE that is destined for another local CPE, the local network router replaces a default gateway with the destination CPE. Accordingly, network resources for routing traffic are significantly reduced.

U.S. Pat. No. 6,978,474 to Sheppard, et al. issued Dec. 20, 2005 entitled "Media interface device" discloses a Residential Gateway (RG) for distributing video, data and telephone services to multiple devices within a residence. The RG receives signals from a telecommunications network, converts the signals to formats compatible with the multiple devices, and transmits the appropriate signals to the appropriate devices. Wireless remote control devices (RCs) associated with remotely located televisions (TVs) transmit channel select commands to the RG as wireless signals. The wireless signals are received by Remote Antennae Packages (RAPs) coupled to the remotely located TVs. The RAPs transmit the wireless signals over coaxial cable to a Media Interface Device (MID) coupled to the RG. The MID extracts the channel select commands and forwards them to the RG. The MID is also capable of combining and splitting TV signals, and adjusting the impedance of network signals so that they can be transmitted over the coaxial cable.

United States Patent Application Publication No. 20010030950 to Chen, et al. published Oct. 18, 2001 entitled "Broadband communications access device" discloses an integrated phone-based home gateway system. The integrated phone-based home gateway system includes a broadband communication device, such as digital subscriber line ("DSL") device, an analog modem, and a wireless interface, integrated into a screen-phone for providing broadband communication service to home users. Multiple home users are able to access the Internet and the content services for conducting e-commerce, receiving content news, entertaining on-demand, making audio or video communications, and telecommuting or working at home. This screen-phone based, modular, plug-n-play home gateway interface allows in-home as well as to-home networking, provides automatic data and broadband initialization, configuration and service provisioning, routing and bridging functionality and allows resource sharing among home devices via the existing phone wire, wireless, coaxial or optical cable connections.

United States Patent Application Publication No. 20050055729 to Atad, et al. published Mar. 10, 2005 entitled "Video broadcasting with return channel" discloses a TV broadcasting system that comprises: an outward broadcast link to reach each of a plurality of user receiver installations via satellite or via a terrestrial channel, and a return link from each of said plurality of users, said return channel being a terrestrial channel via a wide area network, typically a WAN, of which WAN said user receiver installations form a node. The WAN may also support an uplink. A satellite or terrestrial receiver installation is modified with an extra terrestrial antenna for the WAN and a splitter combiner allows the already installed cable link to the TV receiver to be retained. A residential gateway allows a household LAN and communication enabled devices to be supported via the TV/WAN infrastructure.

United States Patent Application Publication No. 20050165899 to Mazzola published Jul. 28, 2005 entitled "Provisioning quality of service in home networks using a proxy interface" discloses a home gateway and interface system and method for providing quality of service to a home LAN device on a home network that is not QoS capable. The gateway comprises a modem (e.g., cable, DSL modem) and a portal service proxy interface. The modem is connected between the home network and a WAN cable network, and is operable to bridge traffic between the home LAN of the home network and the WAN cable network. The portal service interface is connected to the modem and is utilized as a proxy for QoS reservations and data communications between the home LAN devices on the home network. The portal interface acts on behalf of a client to make requests of the non-QoS capable home LAN devices and communicate these QoS needs to the QoS capable devices.

United States Patent Application Publication No. 20060041915 to Dimitrova, et al. published Feb. 23, 2006 entitled "Residential gateway system having a handheld controller with a display for displaying video signals" discloses a residential gateway system that includes a residential gateway to which a plurality of video and audio signal recording and reproducing devices, video and audio sources, including satellite, cable, Internet, are connected, and including a handheld controller for communicating with and controlling the residential gateway. The handheld controller has a display screen for displaying icons for controlling the residential gateway, and for displaying video signals from the residential gateway. Since the display capabilities of the display screen of the handheld controller are limited, the residential gateway includes a transcoder for transcoding video signals for transmission to the handheld controller such that the transmitted video signals may be displayed in their entirety on the display screen of the handheld controller. By transcoding the video signals prior to transmission, valuable bandwidth of the network channel connecting the handheld controller to the residential gateway is save for the transmission of other information and signals.

United States Patent Application Publication No. 20060136968 to Han, et al. published Jun. 22, 2006 entitled "Apparatus for distributing same/different digital broadcasting streams in heterogeneous home network and method thereof" discloses an apparatus for distributing same/different digital broadcasting streams in a heterogeneous home network and a method thereof. The apparatus includes a home gateway, and a home server, connected to the home gateway through Ethernet and also connected to a PC, a second IP STB, a 1394 STB, an HAS (Home Auto System) and an HDTV receiver, for outputting a ground-wave broadcast, a satellite broadcast and a cable broadcast to their HDTV receivers, respectively, through the second IP STB and the 1394 STB if the ground-wave broadcast, the satellite broadcast and the cable broadcast are received through coaxial cables, interworking with the HAS in order to control home appliances, and directly outputting the broadcast to the HDTV receiver through a built-in STB function. According to the apparatus, a user having a plurality of HDTV receivers at home can simultaneously view a plurality of HDTV broadcasts irrespective of the broadcasting systems when a plurality of heterogeneous home networks match through a home network matching device.

However, despite the foregoing variety of prior art "gateway" configurations, the various supported functions are still substantially disparate in terms of their hardware and software environments. This is particularly true in extant cable television installations, wherein the user must have a separate cable modem, set-top box, VoIP telephony unit, PC, etc. to perform these differing functions. "Cross-over" between the environments (e.g., moving content or data from one environment to the other) is often quite limited as well due to either hardware/software incompatibilities, conditional access or digital rights management (DRM) constraints, and the like.

Moreover, many of the aforementioned device architectures typically leverage a number of costly and in some cases duplicative technologies. This adds cost not only for the consumer (e.g., those buying retail devices), but also to the network operator such as a cable MSO, since they must expend more in outfitting a subscriber with given capabilities than they would otherwise, were less costly and less duplicative technologies used. One salient example of this is the use of multiple tuners and supporting RF front-end components (e.g., modulators/demodulators, DACs/ADCs, etc.) in each separate device; e.g., one or more video tuners, and an OOB tuner, within a given STB or DVR. The OOB tuner is to communicate out-of-band with the headend or another network entity during operation, while the video or in-band tuners allow for reception and decoding of programming. These multiple tuners and supporting RF and processing components add significant cost to a device.

Hence, there is a need to reduce the capital cost to both network operators and customers related to deployment of customer premises equipment, while at the same time preserving current services and features, and enabling the ready adoption new capabilities in the consumer's premises. Such reduction would ideally be provided through apparatus and methods that would simplify premises equipment and network infrastructure through e.g., unification of one or more functions present within the various equipment environments.

SUMMARY OF THE INVENTION

The present invention satisfies the foregoing needs by providing, inter alia, improved apparatus and methods for premises content signaling and content delivery.

In accordance with a first aspect of the invention, a gateway device is disclosed. In one embodiment, the gateway device is for use in a content-based network, and comprises: first apparatus adapted to receive first signals transmitted over a first frequency band via the network; second apparatus adapted to receive second signals transmitted over a second frequency band via the network, and transmit third signals over the second band also via the network; and an interface to another premises device. The other premises device utilizes the second apparatus as a communications proxy for transmitting the third signals via the second band that would otherwise have to be transmitted via a separate interface to the network. For example, the other premises device comprises a set-top box having only an in-band tuner, and not capable of communicating over the second frequency band directly.

In one variant, the gateway device further comprises a converged premises device having a cable LAN interface and an Ethernet LAN interface.

In another variant, the gateway device further comprises a digital video recorder, and the another device comprises a set-top box (STB).

In still another variant, the first signals comprise in-band downstream signals received over a coaxial cable, and the second signals comprise downstream data signals also received over the coaxial cable, and the third signals comprise out-of-band upstream signals.

In another embodiment, the gateway device comprises: first apparatus adapted to receive first signals transmitted over a first frequency band via the network, and transmit second signals over the first band also via the network; a first data interface to a first premises device; and a second data interface to a second premises device. The first frequency band comprises a band used for either out-of-band (OOB) signaling or cable modem operation; and the first and second premises devices each utilize the first apparatus as a communications proxy for transmitting the second signals.

In one variant, the content-based network comprises a cable network, and the first premises device comprises a set-top box (STB), and the second device comprises a digital video recorder (DVR). The STB and the DVR comprise only in-band tuners.

In another variant, the first and second premises devices each communicate with the first apparatus using an internet protocol (IP). The first apparatus comprises a DOCSIS compliant cable modem with media access controller (MAC).

In yet another variant, the first premises device comprises a personal computer, and the first interface comprises an Ethernet card.

In still another variant, at least one of the first and second interfaces comprises a coaxial cable interface to a MoCA-compliant local area network (LAN).

In yet a further variant, the gateway device comprises network address translation (NAT) capability, and/or a Dynamic Host Configuration Protocol (DHCP) server.

In another variant, the gateway device comprises a transcoder apparatus adapted to encode a signal encoded according to a first format into a second format different from the first.

In yet another variant, the first and second premises devices comprise IP-enabled devices, and the gateway device is adapted to communicate IP protocol data with the first and second premises devices via the first and second interfaces.

In still a further variant, the gateway device comprises a transcryption apparatus adapted to transcrypt data from a first security environment to a second security environment. The first security environment comprises e.g., a conditional access environment, and the second security environment comprises a digital rights management (DRM) environment.

In a second aspect of the invention, a set-top box apparatus is disclosed. In one embodiment, the apparatus comprises: first apparatus adapted to receive, demodulate, and decode encoded video signals sent via a cable television network; and second apparatus configured to communicate data or signals with a premises device via a communication channel, the premises device being adapted to provide out-of-band (OOB) communication with one or more other entities on the cable television network based at least in part on the data or signals. The premises device acts as an OOB communication proxy for the set-top box apparatus.

In one variant, the first apparatus comprises an in-band tuner, and the second apparatus comprises an OOB signaling interface.

In another variant, the first apparatus comprises an in-band tuner, and the second apparatus comprises an IP-based media access controller (MAC).

In a third aspect of the invention, a digital video recorder apparatus is disclosed. In one embodiment, the apparatus comprises: first apparatus adapted to receive, demodulate, and decode encoded video signals sent via a cable television network; second apparatus adapted to record the decoded video signals for subsequent playback or transmission; and third apparatus configured to communicate data or signals with a premises device via a communication channel, the premises device being adapted to provide out-of-band (OOB) communication with one or more other entities on the cable television network based at least in part on the data or signals. The premises device acts as an OOB communication proxy for the digital video recorder apparatus.

In one variant, the premises device comprises an out-of-band tuner, and the second apparatus comprises a hard-disk drive, and the apparatus enforces at least one of a trusted domain (TD) or authorized service domain (ASD) content protection policy.

In another variant, the premises device and the digital video recorder comprise a unified form factor.

In yet another variant, the premises device further comprises an interface to a set-top box having only an in-band tuner, the premises device acting as an OOB communication proxy for the set-top box.

In a second embodiment, the DVR comprises an OOB tuner and one or more in-band (e.g., video) tuners for e.g., supporting DVR functions, and acts as an OOB proxy for an associated STB, which only includes an in-band receiver.

In a fourth aspect of the invention, premises gateway apparatus for use with a content-based network is disclosed. In one embodiment, the apparatus comprises: a first tuner adapted to receive first signals in a first frequency band from the network, and obtain first data therefrom; a second tuner adapted to receive second signals in a second frequency band from the network, and obtain second data therefrom; a first interface adapted to format the first data according to a protocol, and distribute the formatted data to at least one first premises device in data communication with the gateway apparatus; and a second interface adapted to at least distribute the second data to at least one second premises device in data communication with the gateway apparatus.

In one variant, the network comprises a cable television network, the first signals are delivered over the network associated with in-band QAMs, and the second signals are delivered over the network associated with out-of-band QAMs. The first interface is adapted to format data packets received via the in-band QAMs according to an internet protocol (IP).

In yet another variant, the second interface comprises a TCP transport layer protocol and an IP network layer protocol, and the at least one second premises device comprises a personal computer.

In still another variant, the at least one first premises device comprises an IP-enabled digital set-top box, and the second tuner apparatus is further adapted to transmit signals in the second frequency band over the network to a distant entity.

In a fifth aspect of the invention, a method of delivering video and data services over a network is disclosed. In one embodiment, the network comprises a cable network, and the method comprises: receiving video and data signals at a gateway device from a common coaxial cable; using at least a first tuner to extract the video signals; using at least a second tuner to extract the data signals; processing the video signals according to a network layer protocol to produce a plurality of protocol packets; and delivering the protocol packets to a packet-enabled client device for viewing, the packet-enabled device being in data communication with the gateway device.

In one variant, the method further comprises delivering the data signals to a computerized device in data communication with the gateway device, and the network layer protocol comprises the Internet Protocol (IP).

In another variant, the video signals comprise MPEG-over-IP-over MPEG encoded signals.

In a sixth aspect of the invention, a method of delivering video services over a network is disclosed. In one embodiment, the method comprises: receiving video signals at a first device using a first network interface apparatus; receiving data signals at a second device using a second network interface apparatus, the first and second devices being in data communication with one another; and sending upstream signals destined for a network entity from the first device via the second network interface apparatus of the second device.

In one variant, the first device comprises a set-top box or digital video recorder (DVR), and the second device comprises a premises gateway device.

In another variant, the first device comprises a set-top box or digital video recorder (DVR), the second network interface apparatus comprises a cable modem, and the method further comprises receiving, via the second network interface apparatus of the second device, downstream signals from a network entity, the signals destined for the first device.

In yet another variant, the first device and the second device comprise a trusted security domain, and the method further comprises enforcing at least one security policy with respect to at least the video signals within the domain.

In still another variant, at least one of the first device and the second device comprise a secure microprocessor, and the method further comprises downloading at least a common image and a personalized software image to the secure microprocessor pursuant to establishing a conditional access privilege.

In a seventh aspect of the invention, a method of doing business is disclosed. In one embodiment, the method comprises: providing a premises gateway device having at least an out-of-band (OOB) network interface to a subscriber; providing a video rendering or recording device to the subscriber, the rendering or recording device having no out-of-band network interface; and causing the subscriber to use the at least OOB interface of the gateway device for OOB communications between the rendering or recording device and the network.

In a further aspect of the disclosure, a gateway apparatus is disclosed. In one embodiment, the gateway apparatus includes: (i) a first tuner implemented to receive in-band signals from a network, and obtain first data from the in-band signals; (ii) a second tuner implemented to receive out-of-band signals from the network, and obtain second data from the out-of-band signals, a multiplexer, implemented to multiplex the first data and the second data to form third signals; and an interface.

In one variant, the first data and second data may include first Internet Protocol (IP) packets and second IP packets, respectively.

In another variant, the interface implemented to format the third signals and distribute the formatted signals to a plurality of consumer premises devices in data communication with the gateway apparatus.

In another aspect of the disclosure, a gateway apparatus located at a first location proximate a user for use with a content distribution network is disclosed. In one embodiment, the gateway apparatus includes: (i) a tuner; (ii) a first interface implemented to demultiplex and format the first data according to a protocol, and distribute the formatted data to a plurality of consumer premises devices in data communication with the gateway apparatus; and (iii) a second interface implemented to demultiplex and at least distribute the second data to a first one of the plurality of consumer premises devices in data communication with the gateway apparatus located at the first location proximate a user.

In one variant, the tuner may be implemented to: (i) receive in-band signals from the network; (ii) obtain first data from the in-band signals; (iii) receive out-of-band signals from the network; and (iv) obtain second data from the out-of-band signals.

In another variant, the in-band signals and/or out-of-band signals may be received from the network including a Moving Picture Experts Group (MPEG) transport stream.

In still another variant, the out-of-band signals may be identified as intended for a first one of a plurality of consumer premises devices in communication with the premises gateway apparatus located at the first location proximate a user.

In yet another aspect of the disclosure, a method of operating a gateway apparatus is disclosed. In one embodiment, the method includes: (i) receiving in-band signals via a first tuner from the network; (ii) obtaining first data from the in-band signals; (iii) receiving out-of-band signals, via a second tuner, from the network; (iv) obtaining second data from the out-of-band signals; (v) multiplexing the first data and the second data to form third signals; (vi) formatting the third signals; and (vii) distributing, via an interface, the formatted signals to a plurality of consumer premises devices in data communication with the gateway apparatus.

In one variant, the first data and second data may include first Internet Protocol (IP) packets and second IP packets, respectively.

Other features and advantages of the present disclosure will immediately be recognized by persons of ordinary skill in the art with reference to the attached drawings and detailed description of exemplary embodiments as given below.

DETAILED DESCRIPTION OF THE INVENTION

Figure 1:
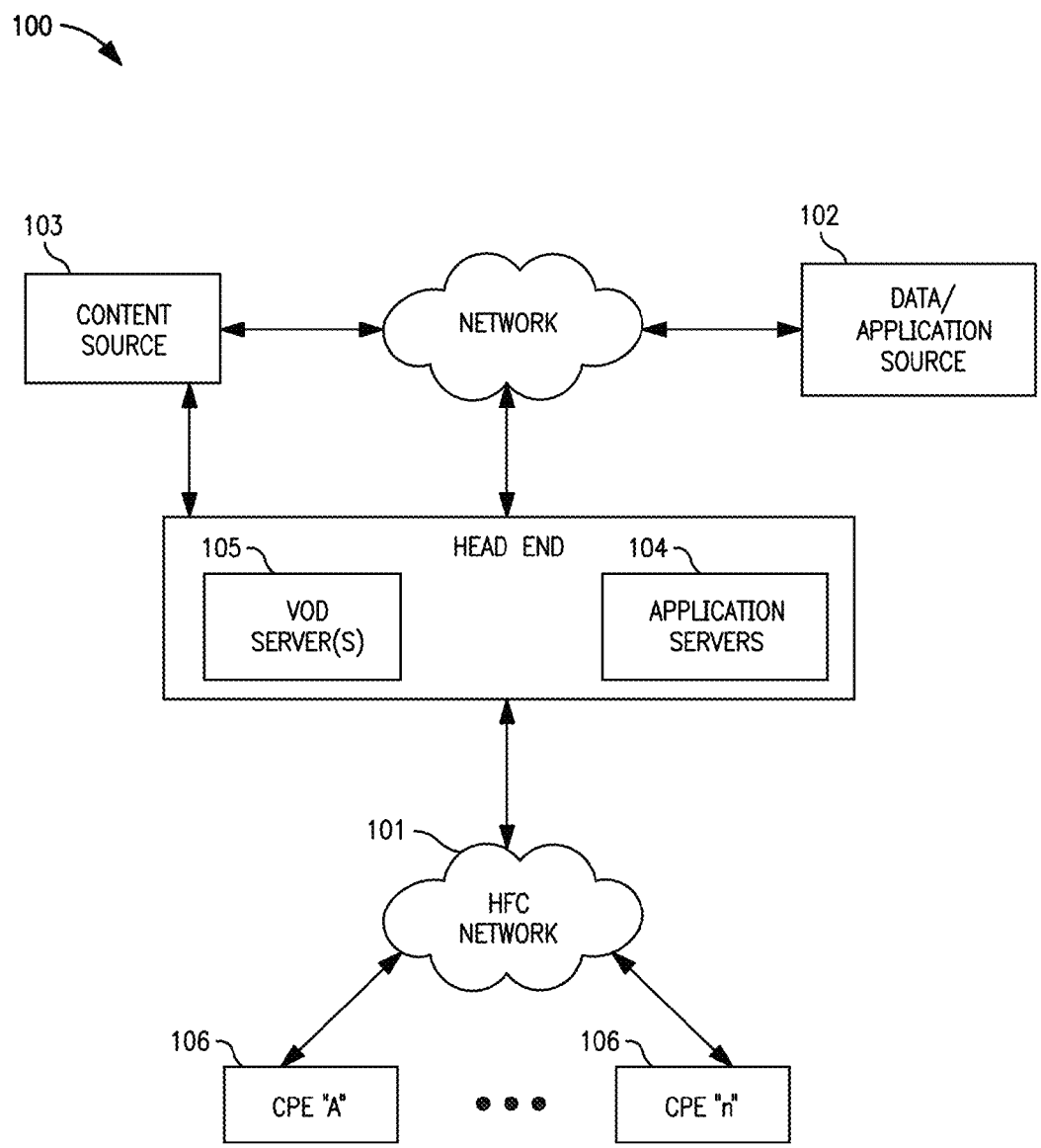
FIG. 1 is a functional block diagram illustrating an exemplary HFC cable network configuration useful with the present invention.

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), such as for example an iPod™, or Motorola ROKR, and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the term "conditional access" refers to any access control scheme, whether implemented in hardware, software, or firmware (or combinations thereof), including without limitation members of the "PowerKey™" family, NDS (including VideoGuard, mVideoGuard, etc.), DVB, and Motorola/General Instrument DigiCipher® family (DigiCipher II, etc.). These can be implemented using, for example, CA-specific hardware/software elements embedded in the device, the so-called "CableCARD™" plug-in security module access technology, a downloadable CA system (DCAS), or otherwise.

The terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes (e.g., DSTBs), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DVI" (digital video interface) refers generally to any type of interface (e.g., hardware and/or software) adapted to provide interface and/or conversion between different formats or domains, including without limitation interfaces compliant with the Digital Display Working Group (DDWG) DVI specification (e.g., DVI-A, DVI-D, and DVI-I). For example, using a DVI connector and port, a digital signal sent to an analog monitor is converted into an analog signal; if the monitor is digital, such as a flat panel display, no conversion is necessary. A DVI output is an option in OpenCable compliant hardware that provides a high-definition TV (HDTV) output which includes copy protection.

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multi-function system.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional headends may be in the same or different cities.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the terms "network agent" and "network entity" refers to any network entity (whether software, firmware, and/or hardware based) adapted to perform one or more specific purposes. For example, a network agent or entity may comprise a computer program running in server belonging to a network operator, which is in communication with one or more processes on a CPE or other device.

As used herein, the term "node" refers without limitation to any location, functional entity, or component within a network.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), or IrDA families.

As used herein, the term "server" refers to any computerized component, system or entity regardless of form which is adapted to provide data, files, applications, content, or other services to one or more other devices or entities on a computer network.

As used herein, the terms "source" and "sink" refer generally and without limitation to sources of content (e.g., data, video, audio, multimedia, files, games, cryptographic elements, etc.) and users or requesters of content, respectively.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "user interface" refers to, without limitation, any visual, graphical, tactile, audible, sensory, or other means of providing information to and/or receiving information from a user or other entity.

As used herein, the term "WiFi" refers to, without limitation, any of the variants of IEEE-Std. 802.11 or related standards including 802.11 a/b/g/n.

As used herein, the term "wireless" means any wireless signal, data, communication, or other interface including without limitation WiFi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

The present invention provides, inter alia, methods and apparatus unifying at least portions of the functionality of a set-top box (STB) or similar customer premises device, or a digital video recorder (DVR), with those of another device such as a cable modem. In one exemplary variant, the out-of-band signaling and communication functions typically necessary on STBs and DVRs are obviated in favor of a premises services gateway (PSG) device, which acts as a unified proxy for all inbound (downstream) and outbound (upstream) communications with the network. This approach is particularly useful to help reduce a cable provider's capital expenditures in manufacturing customer premises equipment (CPE), since the "proxied" DVR and STB no longer require an OOB tuner, and hence their cost can be reduced and simplicity, space efficiency, and even reliability increased.

The present invention can also be advantageously utilized to consolidate in-band tuner resources as well, thereby further reducing capital costs associated with subscriber premises installations.

In one variant, communication between the various entities (e.g., DVR and STB and PSG OOB proxy) is accomplished using IP-based communications.

In another variant, client devices that support a cable RF tuner and an IP channel distributed over coaxial cable to the PSG are disclosed. These clients can only implement the IP channel, and therefore receive all video or data information over the IP network only. This reduces the cost of the client devices by removing the tuners and the cable modems from each device.

In other embodiments, one or both of the foregoing DVR and STB are further physically integrated within the PSG, thereby allowing for a fully unified platform. This unified platform can use a common form factor (i.e., one box), a common coaxial interface to the parent network, common AC power supply, end even common operating system, storage devices, and middleware. Common control and user interface environments may also be utilized, such as where a single "universal" remote is provided to afford control of all STB, tuning and DVR functions.

The PSG is also configured to interface with any number of other devices which may be present in the customer's premises, such as e.g., MoCA-based LANs, Ethernet LANs, WiFi LANs, PANs, or even personal media devices (PMDs). The PSG can also act as a router, provide network address translation (NAT) functions, and even act as a DHCP server if so configured.

In another aspect, the exemplary PSG embodiments disclosed herein further facilitate the aim of easier movement of content within a "trusted domain" or authorized service domain (ASD) by inter alia unifying multiple devices and functions within a single device.

DETAILED DESCRIPTION OF EXEMPLARY EMBODIMENTS

Exemplary embodiments of the apparatus and methods of the present invention are now described in detail. While these exemplary embodiments are described in the context of the aforementioned hybrid fiber coax (HFC) cable system architecture having an multiple systems operator (MSO), digital networking capability, and plurality of client devices/CPE, the general principles and advantages of the invention may be extended to other types of networks and architectures, whether broadband, narrowband, wired or wireless, or otherwise, the following therefore being merely exemplary in nature.

It will also be appreciated that while described generally in the context of a consumer (i.e., home) end user domain or premises, the present invention may be readily adapted to other types of environments (e.g., commercial/enterprise, government/military, etc.) as well. Myriad other applications are possible.

It is further noted that while described primarily in the context of a cable system with 6 MHz RF channels, the present invention is applicable to literally any network topology or paradigm, and any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

Also, while certain aspects are described primarily in the context of the well-known IP or Internet Protocol (described in, inter alia, RFC 791 and 2460), it will be appreciated that the present invention may utilize other types of protocols (and in fact bearer networks to include other internets and intranets) to implement the described functionality.

It will further be appreciated that while the exemplary embodiments presented herein are described in the context of services that may include multicast and unicast data, the present invention is applicable to other types of services that include multicast transmission of data delivered over a network having multiple physical channels or even virtual or logical channels.

Other features and advantages of the present invention will immediately be recognized by persons of ordinary skill in the art with reference to the attached drawings and detailed description of exemplary embodiments as given below.

Network—

FIG. 1 illustrates a typical content-based network configuration with which the apparatus and methods of the present invention may be used. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the headend architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104.

Figure 1A:
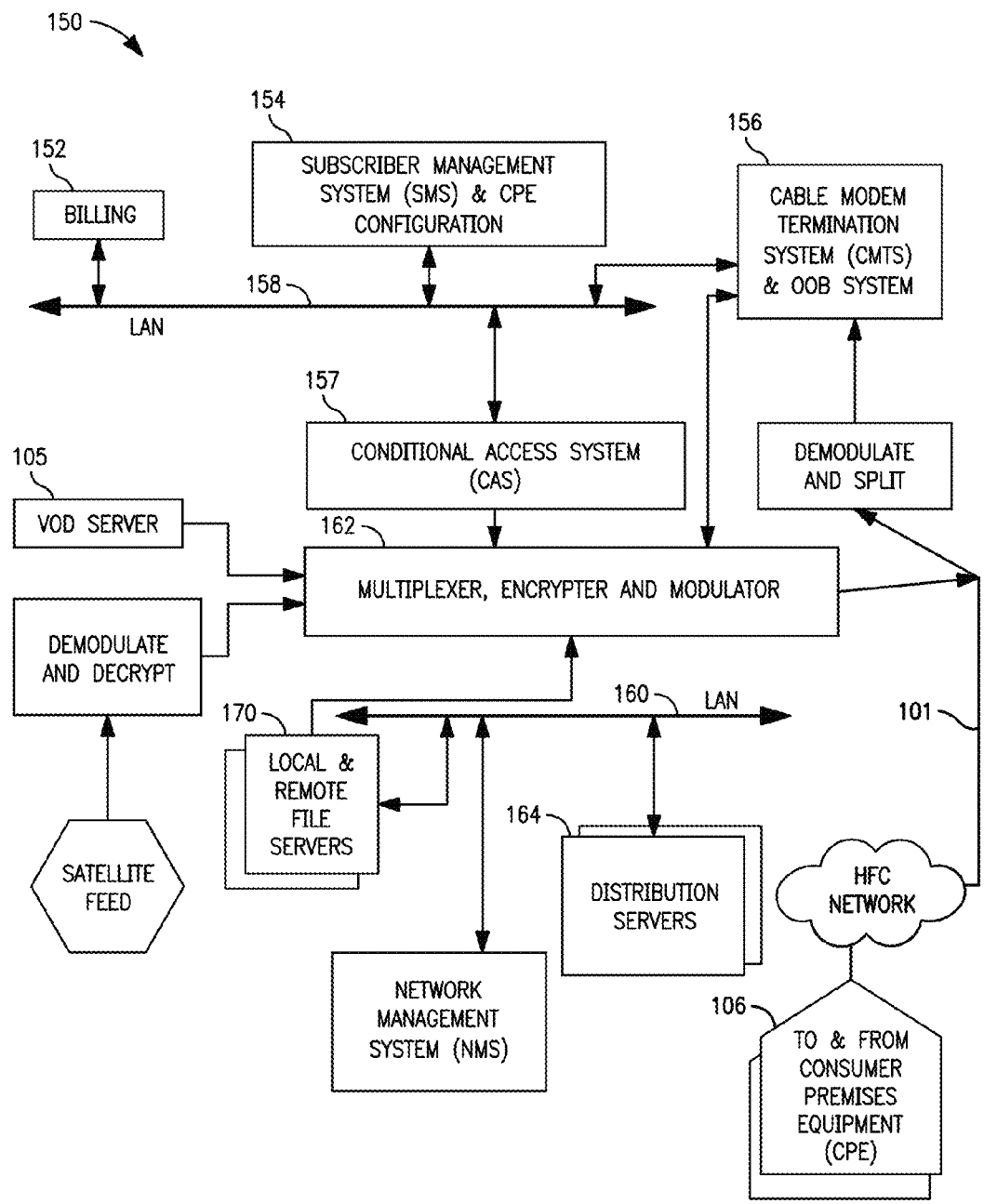
FIG. 1a is a functional block diagram illustrating one exemplary HFC cable network headend configuration useful with the present invention.
Figure 1B:
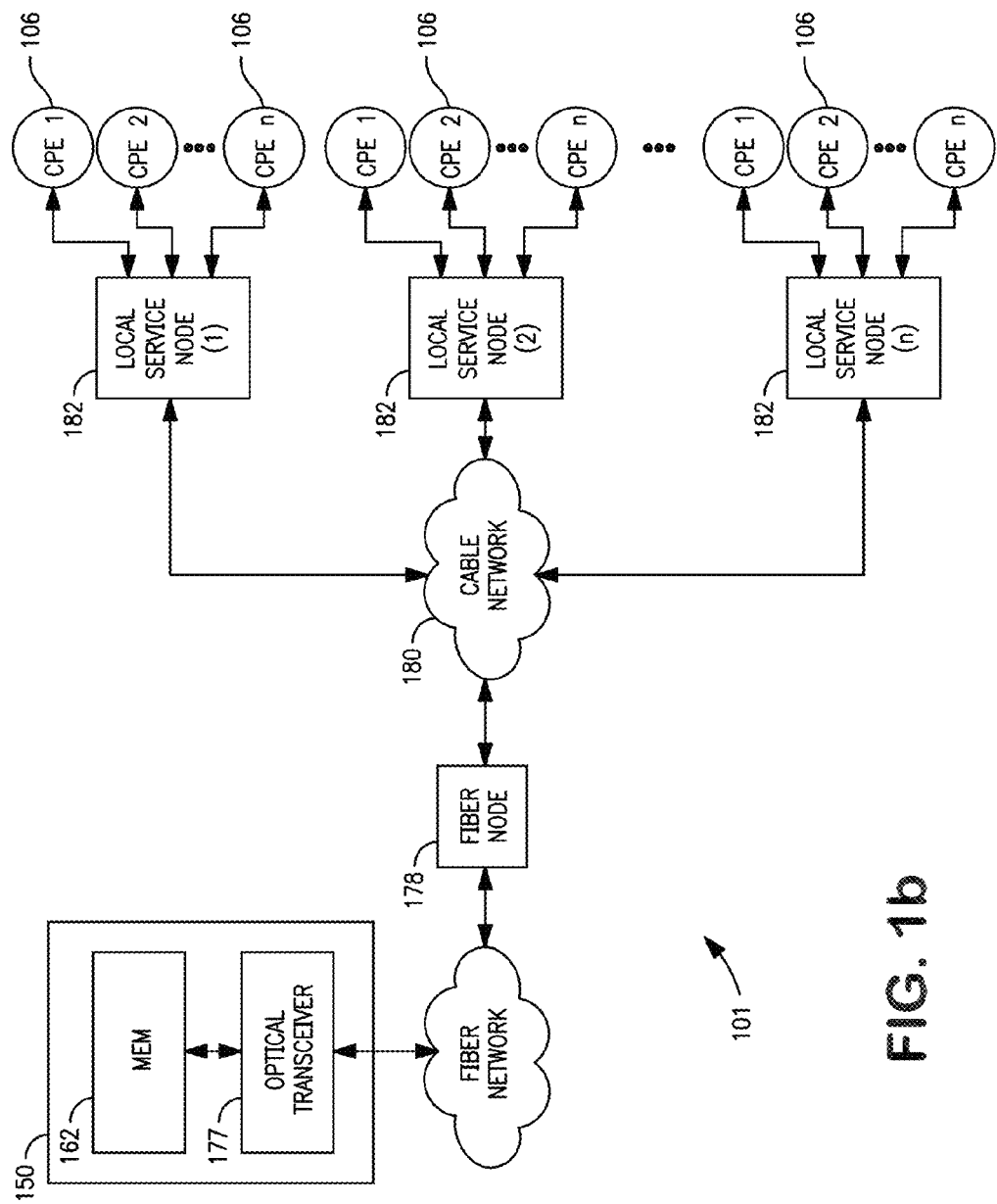
FIG. 1b is a functional block diagram illustrating one exemplary local service node configuration useful with the present invention.

Referring now to FIG. 1a, one exemplary embodiment of a headend architecture useful with the present invention is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1a is high-level, conceptual architecture and that each MSO may have multiple headends deployed using custom architectures.

The architecture 150 of FIG. 1a further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend and sent to neighborhood hubs via a variety of interposed network components.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

"Switched" Networks—

Figure 1C:
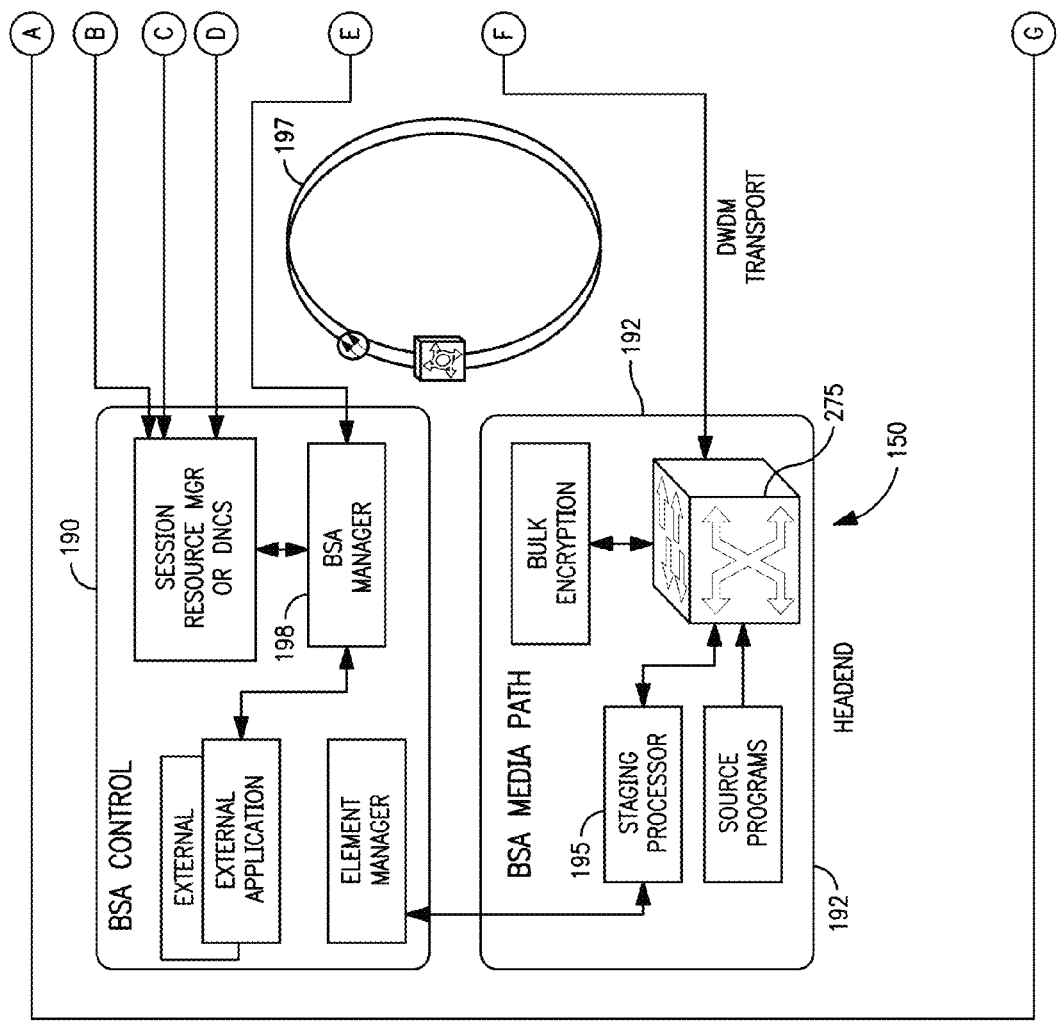
FIG. 1c is a functional block diagram illustrating one exemplary broadcast switched architecture (BSA) network useful with the present invention.
Figure 1C:
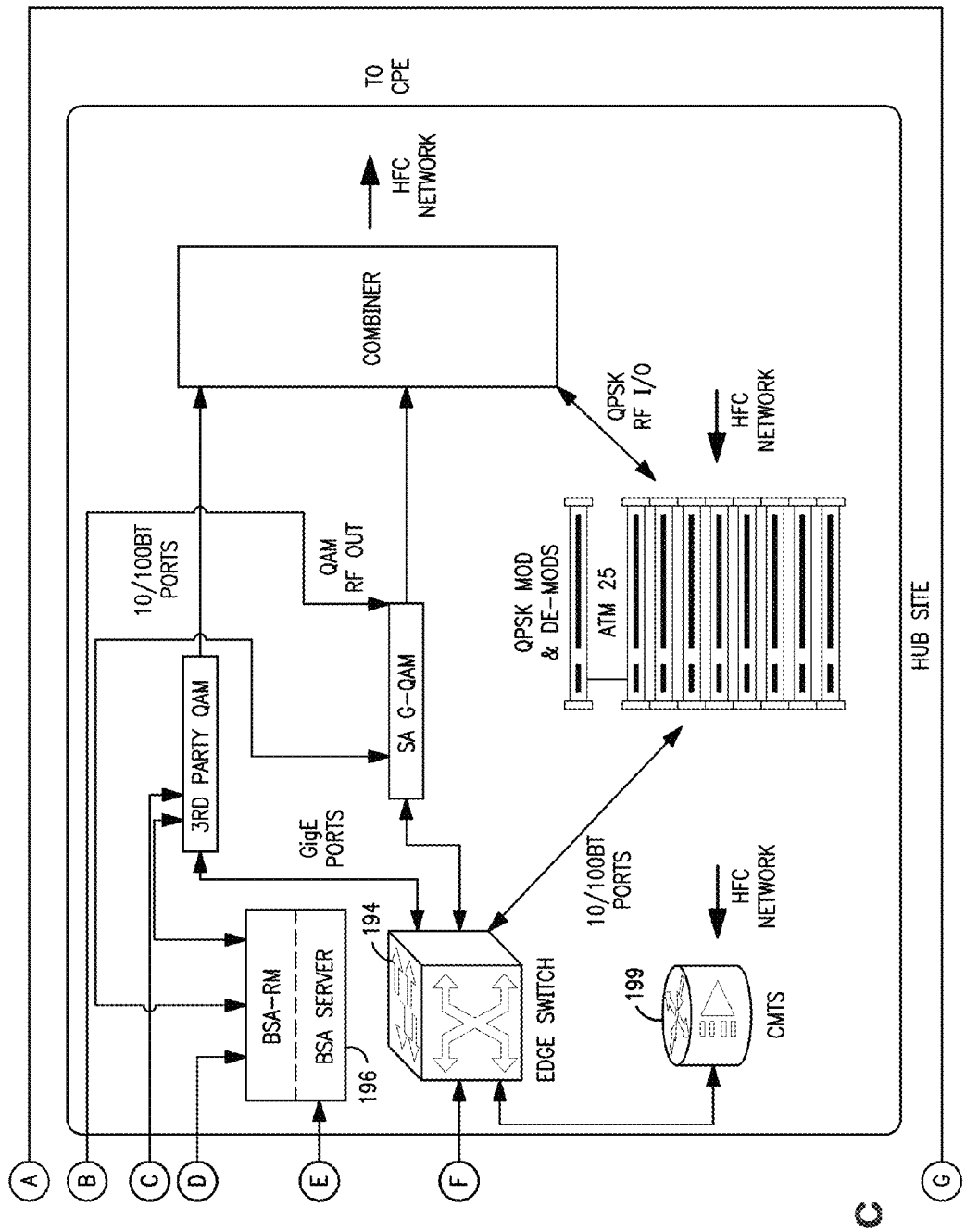

FIG. 1c illustrates an exemplary "switched" network architecture also useful with the premises gateway apparatus and features of the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned U.S. patent application Ser. No. 09/956,688 filed Sep. 20, 2001 and entitled "TECHNIQUE FOR EFFECTIVELY PROVIDING PROGRAM MATERIAL IN A CABLE TELEVISION SYSTEM", which issued as U.S. Pat. No. 8,713,623 on Apr. 29, 2014, incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1a and 1c also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Premises Gateway and Network—

Figure 2A:
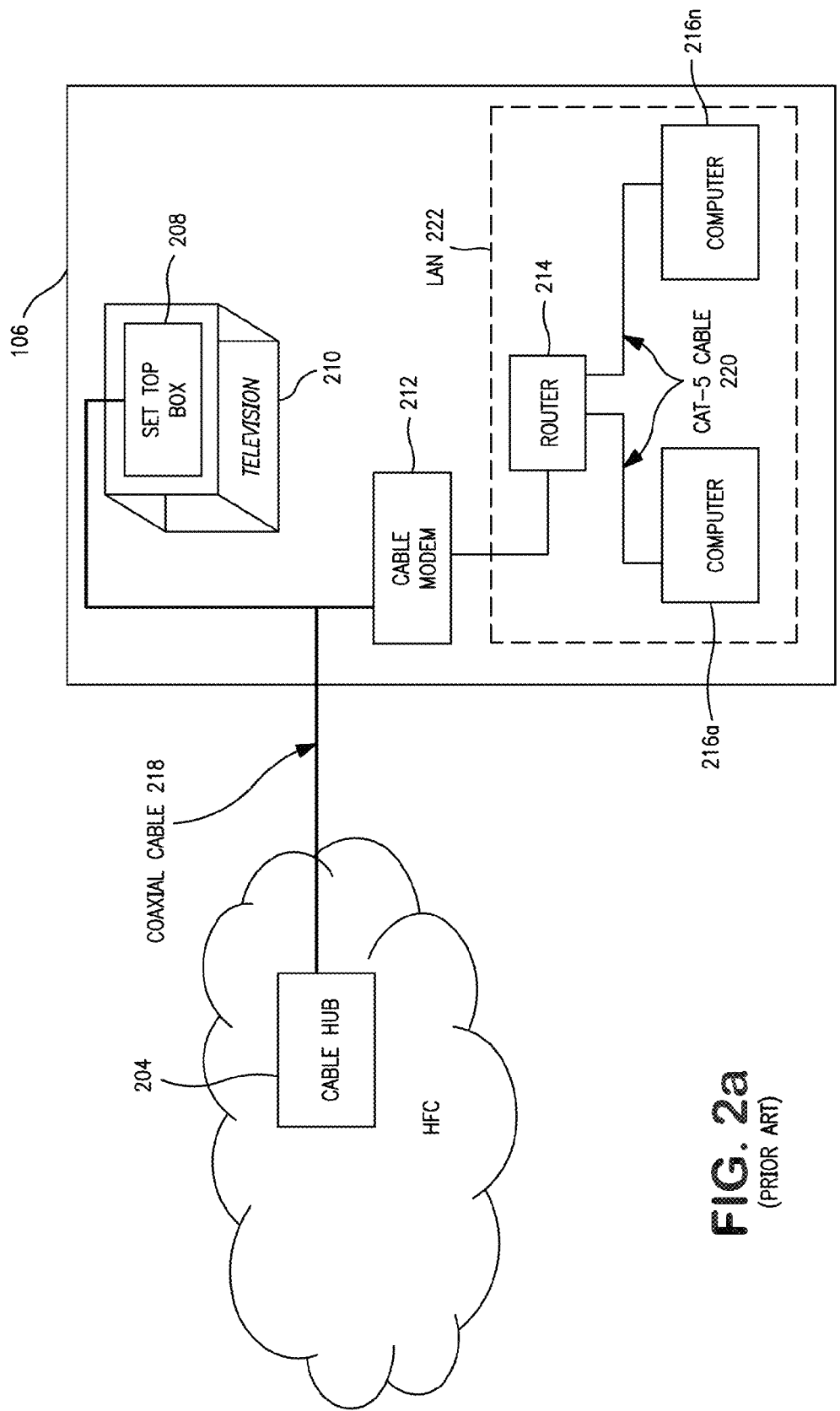
FIG. 2a is a block diagram illustrating a typical prior art premises network topology used with a cable television network.

FIG. 2a illustrates a common prior art premises network topology. The cable headend 150 (FIG. 1a) communicates with the customer premises equipment (CPE) 106 by means of an intermediary HFC network 101 and hub 204. The "last mile" connection to the customer's premises are typically via coaxial cable 218, but in some instances, fiber optic cable replaces coaxial cable as in a fiber-to-the-home (FTTH) implementation. So-called "fiber-to-the-curb" or FTTC optical implementations may also be used. The terminating coaxial cable 218 is routed into the customer premises 106, and is connected to one or more set-top boxes 206 (e.g., DSTB) and/or one or more cable modems 212 (e.g., DOCSIS modem). Typically, program channel content is transmitted downstream from the cable headend 150 or a BSA switching node over in-band frequencies, and internet (e.g., Internet) content is transmitted from the cable modem termination system (CMTS) over DOCSIS frequencies.

A set-top box 206 receives analog signals from the network via the coaxial cable, demodulates the analog signals, converts the demodulated signals into digital signals, and transmits the digital signals to a display device (e.g., television 210) or other apparatus. These signals may also be distributed via e.g., a back-end interface to DVRs, personal media devices (PMDs), and the like.

The cable modem 212 operates in a generally similar fashion. The cable modem 212 receives analog signals from the network, demodulates the analog signals, converts the demodulated signals into digital signals, and transmits the digital signals to a computerized device (e.g., personal computer 216) or series of computers 216a . . . 216n in a premises local area network (LAN) 222.

As illustrated by FIG. 2a, customer premises equipment (CPE) typically comprises the cable modem 212 and the set-top box 208 which are separate physical units. Multiple units typically require more physical space, as well as more wiring, in the customer's premises than a single, integrated device. For example, separate coaxial cable drops may be required for in-band and DOCSIS delivery, as are separate power cords and back-end interfaces. Additionally, the manufacture of separate set-top boxes and cable modems is more expensive than the manufacture a single device incorporating the functionalities of both units. Compatibility issues (whether at a hardware or software level) may arise if the devices are placed in communication with one another; these issues are effectively obviated when a unified device is used, since the device hardware and software (including middleware) necessary to support the various functions are developed commonly, and utilize a common operating system.

Figure 2B:
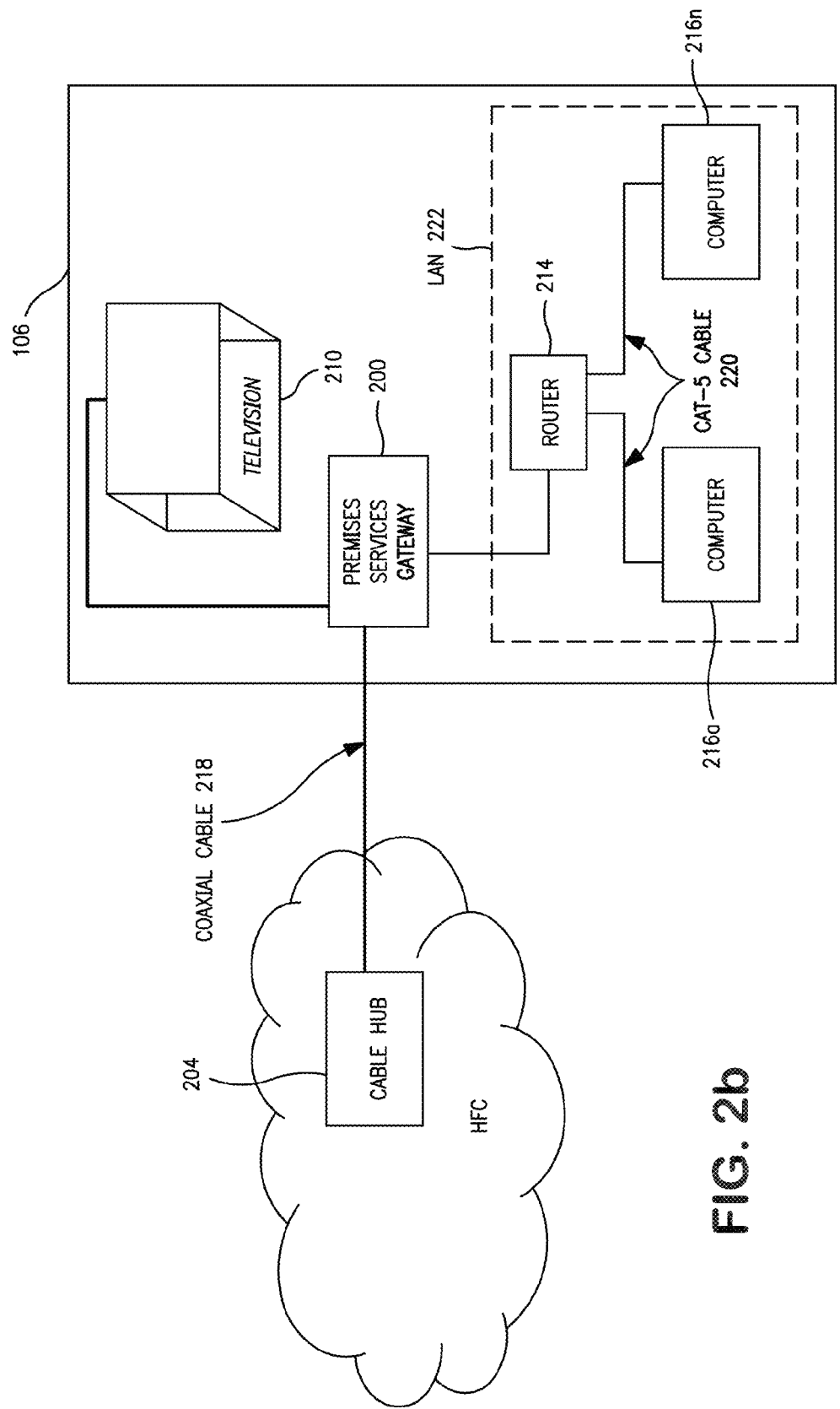
FIG. 2b is a block diagram illustrating a first embodiment of the premises network topology according to the present invention.

FIG. 2b is a block diagram illustrating an exemplary embodiment of a premises network topology according to the invention which utilizes such an integrated device, herein referred to generally as a premises services gateway (PSG) 200, which can take many different forms as described subsequently herein. As stated above, the PSG 200 can if so configured, be used to replace the separate cable modem 212 and the set-top box 208 of FIG. 2a, providing the functionality of both units. Specifically, one exemplary embodiment of the PSG 200 is adapted to receive channel content over in-band frequencies and internet content over DOCSIS frequencies. This can be accomplished via, e.g., use of a wideband tuner, use of multiple tuners, etc. For example, in one embodiment, the PSG 200 comprises an RF front end including two tuners adapted to tune to prescribed in-band and DOCSIS QAMs respectively, delivered over the network 101. A wideband tuner arrangement such as that described in co-owned and co-pending U.S. patent application Ser. No. 11/013,671 entitled "Method and Apparatus for Wideband Distribution of Content" filed Dec. 15, 2004 and incorporated herein by reference in its entirety, may also be utilized, such as where the content associated with one or more program streams (or DOCSIS data streams) is distributed across two or more QAMs.

The PSG 200 then routes the received content (after any necessary intervening processing) to the appropriate target device(s), such as television 210 and/or router 214. Data transmitted to a computer network may be handled by a conventional gateway or router 214 (as depicted by FIG. 2b), switch, hub, proxy server, wireless base station, or other such similar device. The connection from the PSG to the router 214 in FIG. 2b is typically via a standard Ethernet or CAT-5 cable 220 with RJ-45 or similar connector, although other approaches may be used. The connection from the gateway to the computers 216a . . . 216n may be via CAT-5 cable 220 as shown in FIG. 2b, via a wireless interface (e.g., WiFi, PAN, WiMAX, IrDA, etc.) if the router 214 and computers 216a . . . 216n support a wireless transmission medium.

As yet another alternative, indigenous coaxial cable routed in the premises (e.g., for delivery of the cable signal to various rooms in the house) may be used as a medium for delivery of the signals received via the coaxial drop to the PSG 200; i.e., as a coaxial-based LAN. Specifically, in one variant, an IP-over-coax approach of the type well known in the networking arts is used to deliver digital data over the analog coaxial cable throughout the premises. As described below with respect to the embodiment of FIG. 3, the PSG 200 may also act as a unified communications (e.g., OOB) interface or proxy for other components within the premises network or coupled thereto.

Figure 3:
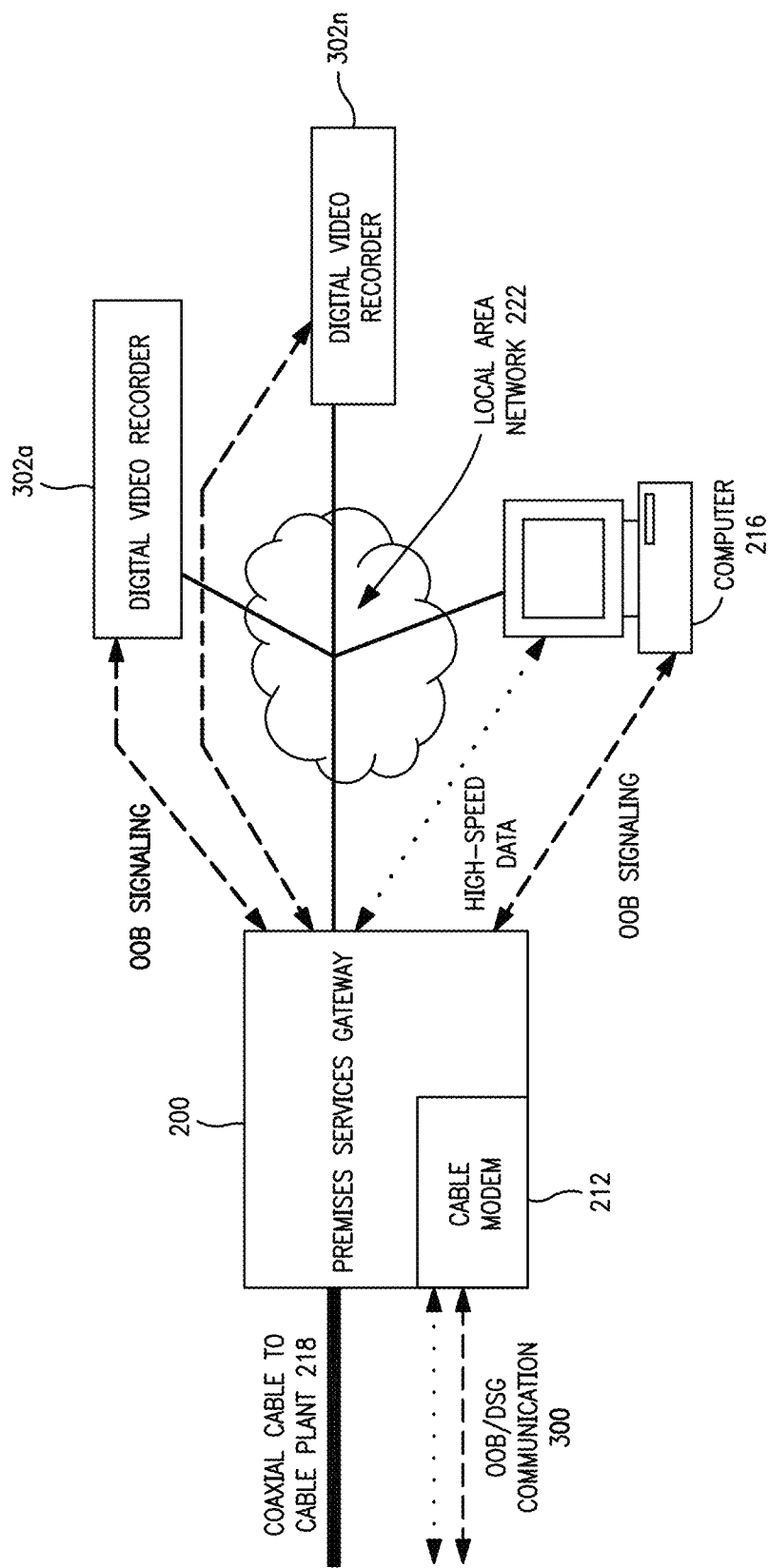
FIG. 3 is a block diagram illustrating a second embodiment of a premises network topology according to the present invention.

FIG. 3 is a block diagram of an exemplary network topology utilizing a PSG 200 according to the invention. In this embodiment, the cable modem 212 comprises a discrete module of the PSG 200, communicating with the network 101 using out-of-band (OOB)/Data services gateway (DSG) communication modes 300. The PSG 200 of FIG. 3 implements an out-of-band data communication proxy for all system information to and from the headend 150 (or other upstream node) for all content rendering devices. This approach obviates the requirement for OOB (e.g., DOCSIS or the like) capability from all but one device at the premises (here, the PSG 200). Hence, all OOB communications (upstream or downstream) from or to the connected devices at the premises LAN can be routed through the PSG's proxy though a single unified interface if desired, although another configuration (e.g., multiple coax drops may be utilized if desired; e.g., in conjunction with a MoCA architecture). The PSG 200 communicates with a plurality of digital video recorder boxes 302a ... 302n and at least one computer 216 over a premises local area network 222 for such OOB traffic, as well as other signals. The computer 216 may also be configured to run an application (e.g., MSO-provided or authorized application) to allow the subscriber to, inter alia, communicate with and configure various aspects of the PSG's operation.

Moreover, the configuration of FIG. 3 may be modified to include a network interface (e.g., coax cable drop) to the authorized service domain (ASD) or trusted domain (TD) plant for that LAN. See also the discussion provided subsequently herein regarding trusted domains and other related security features.

Also as shown in FIG. 3, high-value content such as that distributed to the illustrated DVRs can also be distributed to the PC 216.

The present invention can also be advantageously utilized to consolidate in-band tuner resources as well, thereby further reducing capital costs associated with subscriber premises installations. For example, in one variant, the in-band tuner(s) associated with a given device are "proxied" into the PSG 200 or another such device, thereby obviating having each device maintain its own tuners.

Figure 4:
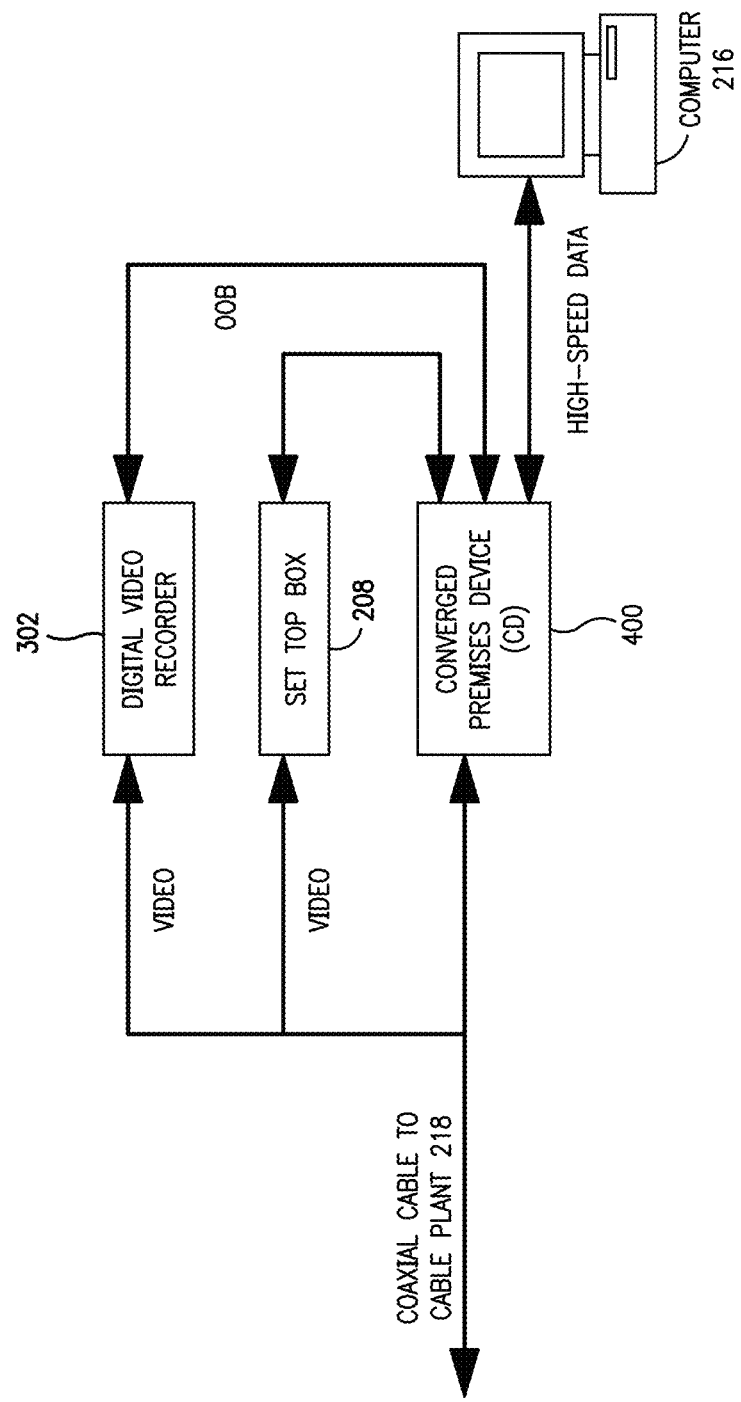
FIG. 4 is a block diagram of another exemplary network premises topology according to the present invention, utilizing a converged premises device (CD).

FIG. 4 is a block diagram of another embodiment of the premises network according to the invention, wherein the PSG 200 further integrates a converged premises device (CD), such as that described in co-owned U.S. patent application Ser. No. 11/378,129 entitled "Methods and Apparatus for Centralized Content and Data Delivery" filed Mar. 16, 2006, which issued as U.S. Pat. No. 8,347,341 on Jan. 1, 2013, and is incorporated herein by reference in its entirety. The exemplary CD 400 comprises a remotely manageable premises device that, inter alia, acts as a centralized client networking platform providing gateway services such as network management as well as traditional content and high-speed data delivery functions. The device also acts as the shared internet (e.g., Internet) connection for all devices in the premises via a cable modem or other such interface, sharing personal and DVR content such as video, music and photos (and any associated metadata) throughout the premises, and providing both a wired and wireless network in the home. Telephony services utilizing e.g., embedded multimedia terminal adapter (eMTA) and/or Wi-Fi architectures may also be provided via the converged device 400; these services can make use of the network operator's indigenous VoIP or comparable telephony capability if desired, thereby providing an even more unified service environment for the subscriber. For example, in one embodiment, the CD or PSG is configured with a Texas Instruments DSP-based Puma-4 VoCable chipset (TNETC4700) that provides support for cellular codecs, low bit-rate codecs and advanced fax capabilities, although it will be recognized that any number of other devices and/or architectures may be used consistent with the invention to provide such functionality.

As previously noted, a wired home network utilizing existing coaxial cable in the premises may also be created, using e.g., an Ethernet-to-coaxial bridge technology based on the MoCA specification. This allows existing devices and DVRs to connect and share content with the CD 400, and also allows the network operator (e.g., MSO) to control and manage the premises coaxial network.

The exemplary CD 400 is also advantageously accessible via any remote device with internetworking (e.g., Internet) capability, thereby allowing personal content to be accessed by the user (or other entities) from outside the premises.

In the embodiment depicted by FIG. 4, downstream data (e.g., content, messaging, etc.) transmitted over in-band frequencies is sent from cable plant 101 (FIG. 1) to a digital video recorder (DVR) 302, set top box 208, and CD 400 via a coaxial cable 218. Downstream data transmitted over out-of-band frequencies (e.g., DOCSIS channels) is routed first to the CD 400 and then transmitted to the digital video recorder 302, set-top box 208, and computer(s) 216. Upstream data (e.g., messaging, content or data files, etc.) is transmitted from digital video recorder 302, set-top box 208, or computer 216 to the CD 400 before being transmitted to the cable plant.

Figure 5:
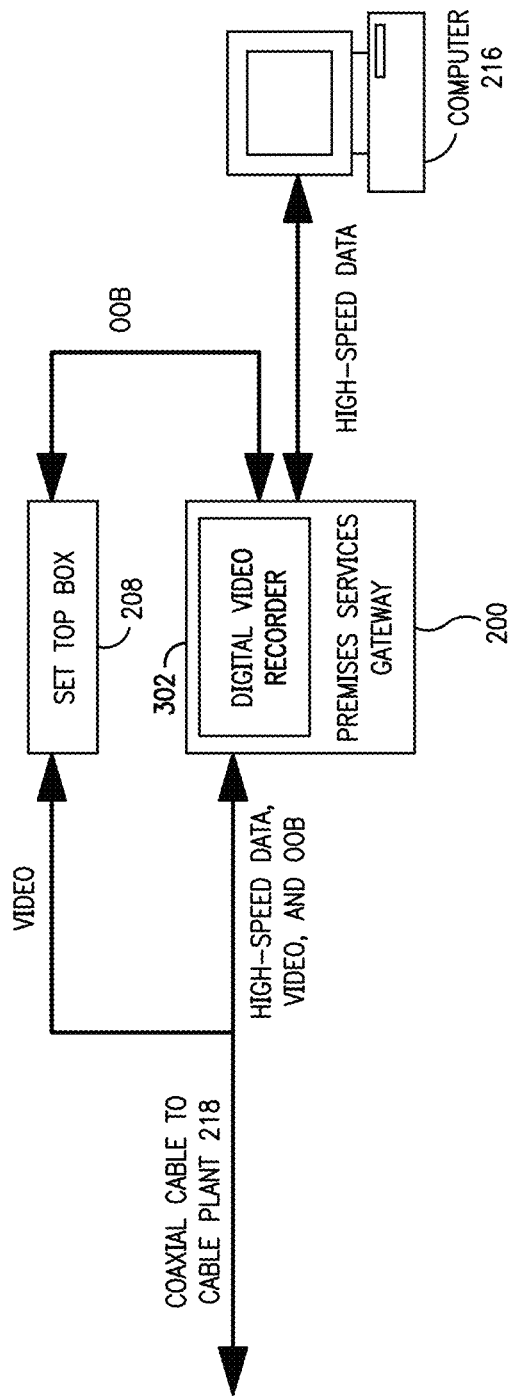
FIG. 5 is a block diagram of yet another network topology according to the present invention, utilizing a premises services gateway (PSG) comprising the functionality of a digital video recorder.

FIG. 5 is block diagram of another exemplary embodiment of the premises network topology according to the invention, wherein the PSG 200 is integrated into a digital video recorder 302. In the embodiment depicted by FIG. 5, downstream data is transmitted over in-band frequencies from the network (not shown) to set-top box 208 and digital video recorder 302 (part of the PSG 200) via coaxial cable 218. Downstream data transmitted over out-of-band frequencies is routed first to the PSG 200 and then transmitted to the computer 216 (e.g., PC, laptop, PMD, etc.). Upstream data is transmitted from set top box 208 or computer 216 to the PSG 200 before being transmitted to the cable plant via the HFC network 101.

Figure 6:
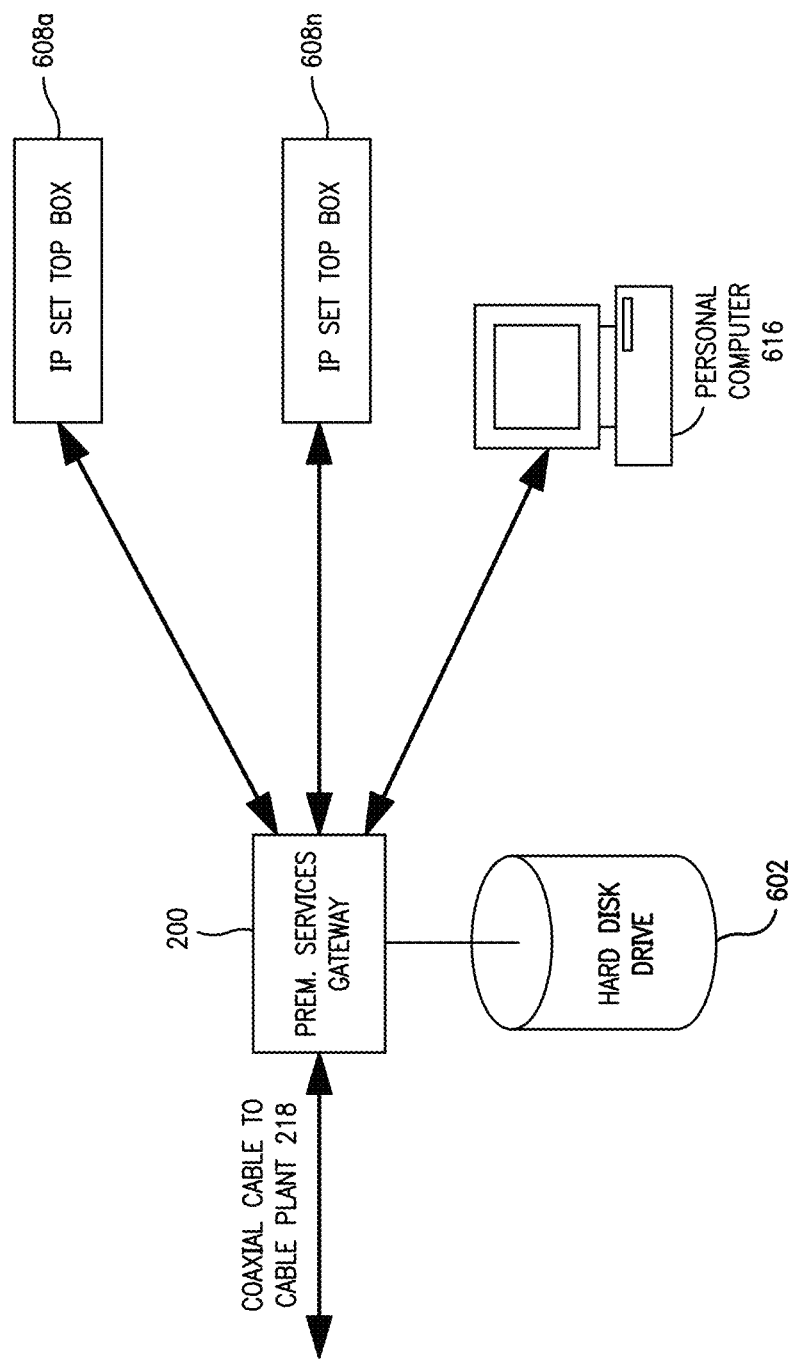
FIG. 6 is a block diagram of an exemplary premises services gateway (PSG) configuration adapted for use in an "all-IP" cable network.

FIG. 6 is a block diagram of yet another embodiment of the premises network topology according to the invention, wherein the PSG 200 is adapted for use in an "all IP" premises network including, e.g., IP TV. The exemplary PSG 200 comprises a hard disk drive (HDD) 602 such as for example one complying with the PATA (e.g., ATA-4/5/6), SATA, or SATA II standards, or other mass storage device that can be used, inter alia, to store content delivered from the network 101 over the coaxial cable 218 (or from other sources, such as connected devices within the premises network). The PSG 200 may communicate with one or more IP-enabled set top boxes 608a ... 608n, and one or more personal computers 616 or PMDs. Communication between the set-top boxes 608a ... 608n, and personal computer 616 and PSG 200 may be facilitated over wireless channels, CAT-5 cables, coaxial cables, or combinations thereof.

The exemplary PSG 200 further comprises apparatus to format data received from the network into data which can be transmitted over an IP network and utilized by set-top boxes 608 and personal computers 616. Specifically, the embodiment of FIG. 6 includes an analog RF tuner, demodulation, and demultiplexing apparatus, and transcoder as required. As is well known, traditional video content is typically MPEG-based video. Accordingly, this delivery mechanism (e.g., MPEG2 packet stream) may be encapsulated using an IP protocol, or alternatively recoded into another codec format (e.g., Real or Windows Media Player) and then encapsulated using IP or a similar protocol.

Alternatively, the configuration of FIG. 6 also supports video transported to the IP-based PC 616 (or IP-based DSTBs) over a DOCSIS network that is encoded in MPEG (or another video codec)-over-IP over MPEG. That is, the higher layer MPEG or other encoded content is encapsulated using an IP protocol, which then utilizes an MPEG packetization for delivery over the RF channels used by a DOCSIS (or in-band) device.

Moreover, in one embodiment, the methods and apparatus described in co-owned U.S. patent application Ser. No. 11/325,107 filed Jan. 3, 2006, issued as U.S. Pat. No. 7,693,171 on Apr. 6, 2010, and entitled "METHODS AND APPARATUS FOR EFFICIENT IP MULTICASTING IN A CONTENT-BASED NETWORK", incorporated herein by reference in its entirety, may be used consistent with the present invention to provide for efficient IP multicasting under inter alia, the foregoing scenario. Specifically, the foregoing disclosure provides methods and apparatus directed to eliminating or reducing wasted bandwidth associated with multicasting packetized content (including video or another such sizable transmission), and thereby increasing the overall efficiency of the content-based network. In one embodiment, the system utilizes a "switched digital" approach to (i) deliver packetized content only when requested, and (ii) selectively switch cable modems (CMs) or other such CPE to and from certain downstream channels (e.g., DOCSIS QAM-modulated RF channels) based on switching algorithms. These algorithms make use of the fact that in a typical "switched" environment, only a fraction of the available program channels are actually in use; hence, intelligent and timely switching of individual subscribers (or groups of subscribers) can allow for a great reduction in the number of downstream channels that must be allocated to delivery of the content. Moreover, in the DOCSIS environment, the subscriber's cable modems are switched selectively among different downstream QAMs in similar fashion to the switched video previously described, thereby allowing for reduction in the total number of QAMs required to service the DOCSIS functionality (which may include both traditional IP-based network services, as well as high-bandwidth video or "IP TV" content). Advantageously, these cable modems can be rapidly switched with no re-ranging or registration, thereby allowing for a substantially seamless and low-overhead switching transient which is transparent to the user. Hence, the PSG 200 described herein (which incorporated CM functionality) can be configured for such algorithmic switching.

The foregoing approach is particularly useful in the context of IP or similar "multicast" content that is targeted for multiple subscribers by allowing this multicast content to be delivered to multiple subscribers by selectively tuning the subscribers to common channels where the content is already being delivered to other subscribers, thereby allowing for a 1:N expansion of the content with minimal if any replication.

It should be noted that the above-described embodiments of the premises network topology shown in FIGS. 2b-6 are merely exemplary of the broader principles of the invention; many other network configurations and possible topologies can be realized in accordance with the invention.

Security Policy Enforcement Variants—

In another embodiment, the apparatus and methods described in U.S. patent application Ser. No. 11/592,054 filed Nov. 1, 2006 and entitled "METHODS AND APPARATUS FOR PREMISES CONTENT DISTRIBUTION", issued as U.S. Pat. No. 8,732,854 on May 20, 2014, incorporated herein by reference in its entirety, may be used in conjunction with the PSG 200 (or CD 400) of the foregoing embodiments to, inter alia, enforce security policy. Specifically, the foregoing disclosure provides a mechanism for devices connected to a premises network to exchange information, and ultimately share or transfer protected content (including for example audiovisual or multimedia content, applications or data) in a substantially "peer-to-peer" fashion and without resort to a central security server or other such entity. Authorized "browsing" of the content present on one device by another device is also provided. In one exemplary embodiment, an application-level message exchange functionality allows the premises devices to advertise their security capabilities relating to, e.g., protected content, and query other devices for their security capabilities. This query can be performed, for example, by identifying security frameworks or security packages that a device is capable of handling. These frameworks or packages become critical in, inter alia, a heterogeneous security environment. For example, implementations of security frameworks from different vendors can be markedly different, and may or may not interoperate, such as where two different vendors use the same scrambling algorithms (e.g., Data Encryption Standard (DES), triple DES, AES, etc.) that cannot interoperate because the details of their key management are different.

Accordingly, the security architecture residing on two or more different client devices or domains can be reconciled and security information (and ultimately protected content) exchanged without resort to a centralized facility such as a cable headend process or entity. For example, in one embodiment, a "server" CPE (e.g., the PSG 200 or CD 400) and a "renderer" CPE (e.g., a DSTB or DVR) are disposed within a premises network as previously described. Message exchanges between the sever and renderer identify and validate each entity and its security package or framework capabilities, as well as other capabilities that may be necessary to effect the exchange and use of the protected content, data or application (e.g., the presence of an appropriate codec, algorithm, network interface, etc.). These exchanges are all effectively automatic and transparent to the user, thereby making device location and identification, content/data/application exchange, and browsing seamless.

The message exchanges between the server and renderer CPE of the exemplary embodiment may follow the syntax and guidelines of industry-wide interoperability standards such as UPnP, and/or may be specific to a premises networking standard (e.g., Multimedia over Cable Alliance (MoCA) or Home Phone Line Network (HPNA) specifications, WiFi, Ethernet, and so forth). Moreover, this capability can be seamlessly implemented using existing security frameworks and constructs, such as the Authorized Service Domain (ASD) framework previously referenced herein, thereby extending these frameworks with additional capabilities and services including local (e.g., premises network discovery, browsing, and content streaming or transfer). Security information transferred between entities may be passed via an existing in-band or OOB security protocol, or in another embodiment, requesting authentication and passing in only a HostID or comparable data.

The PSG 200 or CD 400 can also provide a trusted or authorized service domain (ASD) for content or data, as well as allowing a subscriber total mobility in the home by not limiting content or data to any one viewing/access location. For example, content or data may be accessed on any monitor in the premises, as well as on a PC or personal media device (PMD). The PSG or CD can also instantiate a trusted domain (TD) within the premises "domain" or PD (such domain which may or may not be co-extensive with the premises itself) if one does not already exist. For example, using a downloadable CA (DCAS) approach, the necessary software and firmware if any can be downloaded to the premises domain, thereby enabling designation of the premises domain as a trusted domain for handling content. The PSG may also act as a unified conditional access apparatus for purposes of a single premises account; i.e., any device "behind" the PSG in that premises could access content subject to DRM and any other CA/security rules. Exemplary methods and apparatus for establishing a downloadable conditional access (DCAS), DRM, or TD environment within a device or domain of a content-based network are described in co-owned U.S. patent application Ser. No. 11/584,208 filed Oct. 20, 2006 entitled "DOWNLOADABLE SECURITY AND PROTECTION METHODS AND APPARATUS", which issued as U.S. Pat. No. 8,520,850 on Aug. 27, 2013 and is incorporated herein by reference in its entirety.

Exemplary trusted domain apparatus and methods are described in co-owned U.S. patent application Ser. No. 11/006,404 filed Dec. 7, 2004 and entitled "TECHNIQUE FOR SECURELY COMMUNICATING AND STORING PROGRAMMING MATERIAL IN A TRUSTED DOMAIN", which issued as U.S. Pat. No. 8,312,267 on Nov. 13, 2012 and is incorporated herein by reference in its entirety, although it will be recognized that other approaches may be used.

Personal Content Server (PCS) Variants—

In yet another embodiment of the invention, the PSG 200 (and any requisite associated devices such as e.g., mass storage, depending on PSG configuration) may be utilized to act as a "personal" or local content server, whereby content may be stored locally within the premises network. In one such embodiment, the PSG is equipped with DVR or comparable storage capability, and acts as the PCS for the local network (i.e., that "behind" the PSG). An ASD or TD may also be maintained for the LAN/PCS as previously described herein, such as via the PSG incorporating a TD and secure microprocessor (SM) and associated downloadable CA features of the type previously discussed.

In another embodiment, the PSG acts as the local PCS, acting as a communications proxy/controller for a connected DVR-capable device.

The PSG of the present invention may also advantageously be configured to act as a local or personal content aggregator; e.g., by presenting a single or unified database, also located at the premises. As noted above, this "unified database" may be indigenous to the PSG 200, such as where a variety of aggregated content such as movies, audio, data files, etc. are stored on a mass storage device or HDD of the PSG 200 itself. Alternatively, the PSG may act as a proxy or access/control point for a unified database stored on a local connected device (e.g., DVR, PC HDD, etc.). It will further be appreciated that the aforementioned unified database need not necessarily be physically unified; i.e., the actual storage location for the content or data elements of the database may physically be distributed among two or more separate storage media, yet logically unified so as to form a virtual unified database. As one example, the HDD of the PSG 200 may be used to contain audio content, the DVR connected to the PSG used to contain video content (e.g., movies), and the HDD of the local PC used to contain data or other such files. Each of these devices can be virtually unified by an application running on the PSG 200 (and client portions running on the respective DVR and PC if required) to present the user interfacing with the PSG, such as via an on-screen display or other GUI, with an aggregate listing of content within the premises network. Unified access to this content may also be provided via e.g., the aforementioned GUI, such as for example where the user can select any given content or data element, and the appropriate application software, codec, etc. is invoked to play or otherwise access the content.

In other embodiments of the PSG-based toplogy approach of the present invention, mechanisms for allowing access to content (e.g., program viewing) delivery over other networks or communication channels outside of the parent content-based network may be used, such as those described in co-owned U.S. patent application Ser. No. 11/440,490 filed May 24, 2006 entitled "PERSONAL CONTENT SERVER APPARATUS AND METHODS", which issued as U.S. Pat. No. 8,280,982 on Oct. 2, 2012 and is incorporated herein by reference in its entirety. For example, in the context of a cable television network, programming or other content delivered to a subscriber over the cable network can be accessed via other (secondary) networks such as the Internet, LANs/WANs/MANs, a wireless service provider (WSP) network, cellular service provider (CSP) network, or even a satellite network.

In one such embodiment, a personal content server located, e.g., at the headend of the bearer (cable) network distributes content to the remote requesting location(s), thereby eliminating repetitious traffic to and from subscriber's premises to fulfill the requests for remote content delivery.

In one variant, information relating to the requesting subscriber's prior activity for the requested content is used as a basis for authorizing delivery of the remote content. For example, the remote content manager may determine whether the requested program was previously stored on the subscriber's PSG 200 or DVR attached to the local (cable) network, such as via communication with the PSG 200 or CD 400.

In another variant of the invention, when the subscriber wishing to access content (e.g., watch a program) from a location outside the bearer network does not have a DVR on his premises, the personal media management server communicates with either a "network DVR" or a "virtual DVR" maintained for the subscriber at the headend or other location outside of the subscriber premises in order to determine remote access privileges.

In yet another variant, activity or status of the tuner(s) within the local premises device (e.g., PSG 200 or CD 400) is used as the basis for controlling or determining delivery of the requested content to the remote location; e.g., the remote user can watch that channel to which the premises tuner is currently tuned.

The requested content advantageously may comprise video, audio, gaming content, software applications, stored data, or any other form of data which can be delivered over a network. On-demand content delivery (including trick mode and similar functions) is also optionally supported through the establishment of a session between the remote client device and a VOD server within the cable headend and control using extant session and stream control protocols (e.g., LSCP). Broadcast or "live" content can also be accessed via this secondary network approach.

Methods—

Figure 7:
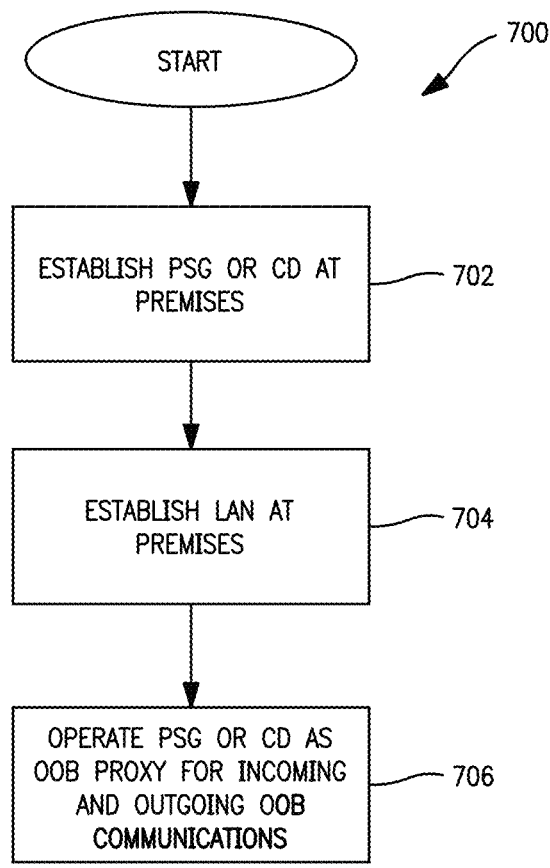
FIG. 7 is a logical flow diagram of a first embodiment of the method of operating a premises network according to the present invention.

FIG. 7 shows one exemplary embodiment of the method 700 of operating a premises network gateway according to the invention. First, the gateway device (e.g., PSG 200 or CD 400 is established within the premises (network) per step 702. This may include transmitting and receiving ("negotiating") network parameters, addresses, and other such operations necessary to enable the gateway device to act as a communication proxy for the other devices connected on the premises network, such as the DSTB, DVR, and personal computer, to the headend or other upstream network node.

Next, the premises "LAN" is established per step 704. As used in this context, the LAN may be as simple as one other connected or communicative device, or may be more complex (such as e.g., a MoCA-based premises LAN with multiple heterogeneous devices communicating therewith (and which may be in communication with other networks via e.g., a gateway, access point or router).

The gateway device finally operates as a proxy for all OOB (e.g., DOCSIS, etc.) signals from the cable network 101, and from the premises LAN, per step 706. Specifically, the exemplary DOCSIS interface (e.g., tuner) receives all downstream DOCSIS high-speed traffic destined for e.g., the PC, as well as all OOB signaling for the DVR, DSTB, and other devices. Similarly, the DOCSIS interface operates to transmit all upstream signaling from the premises LAN onto the network 101.

Figure 8:
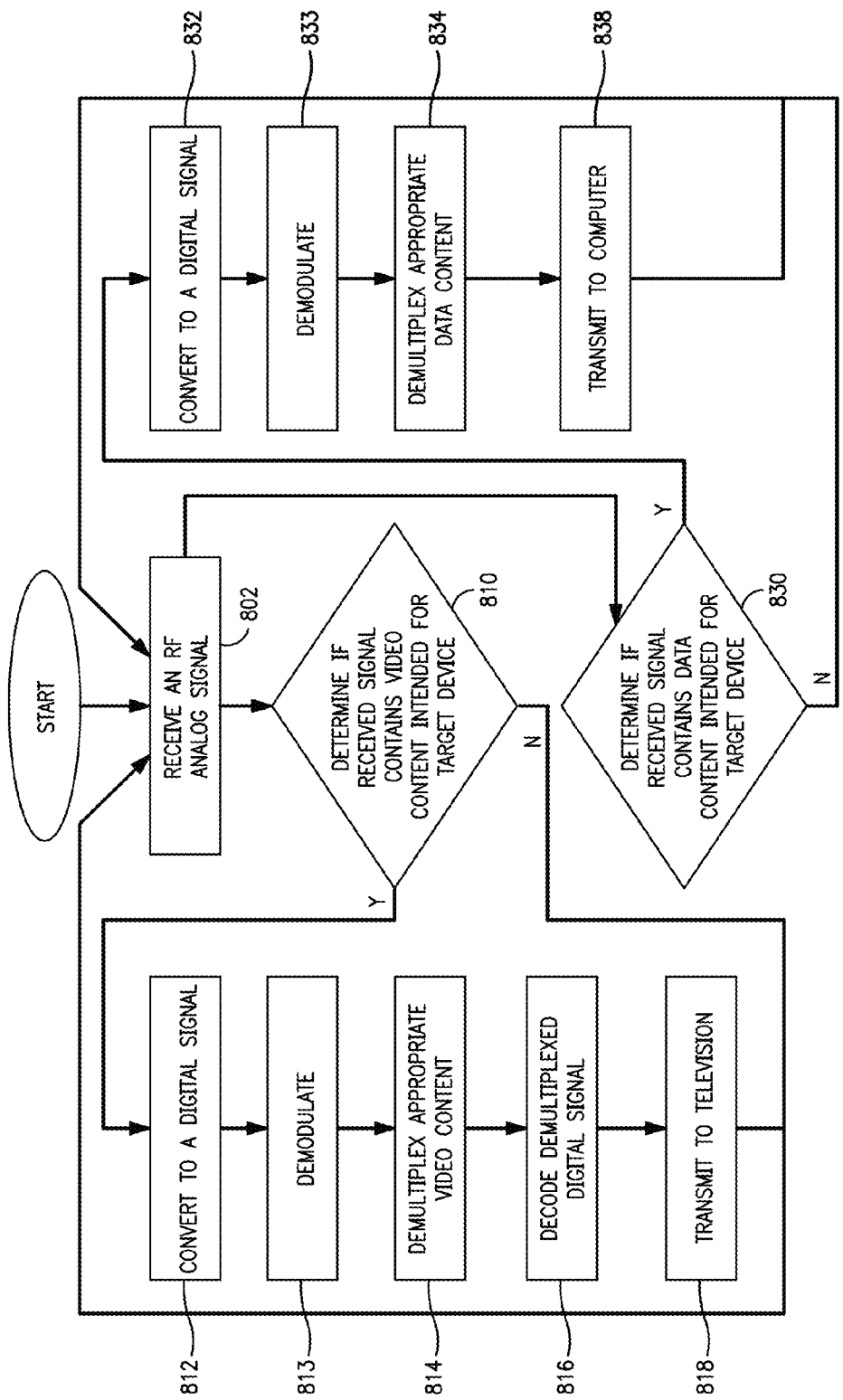
FIGS. 8 and 8a are logical flow diagrams of a second embodiment of the method of operating a premises network according to the present invention, and a variant thereof, respectively.
Figure 9:
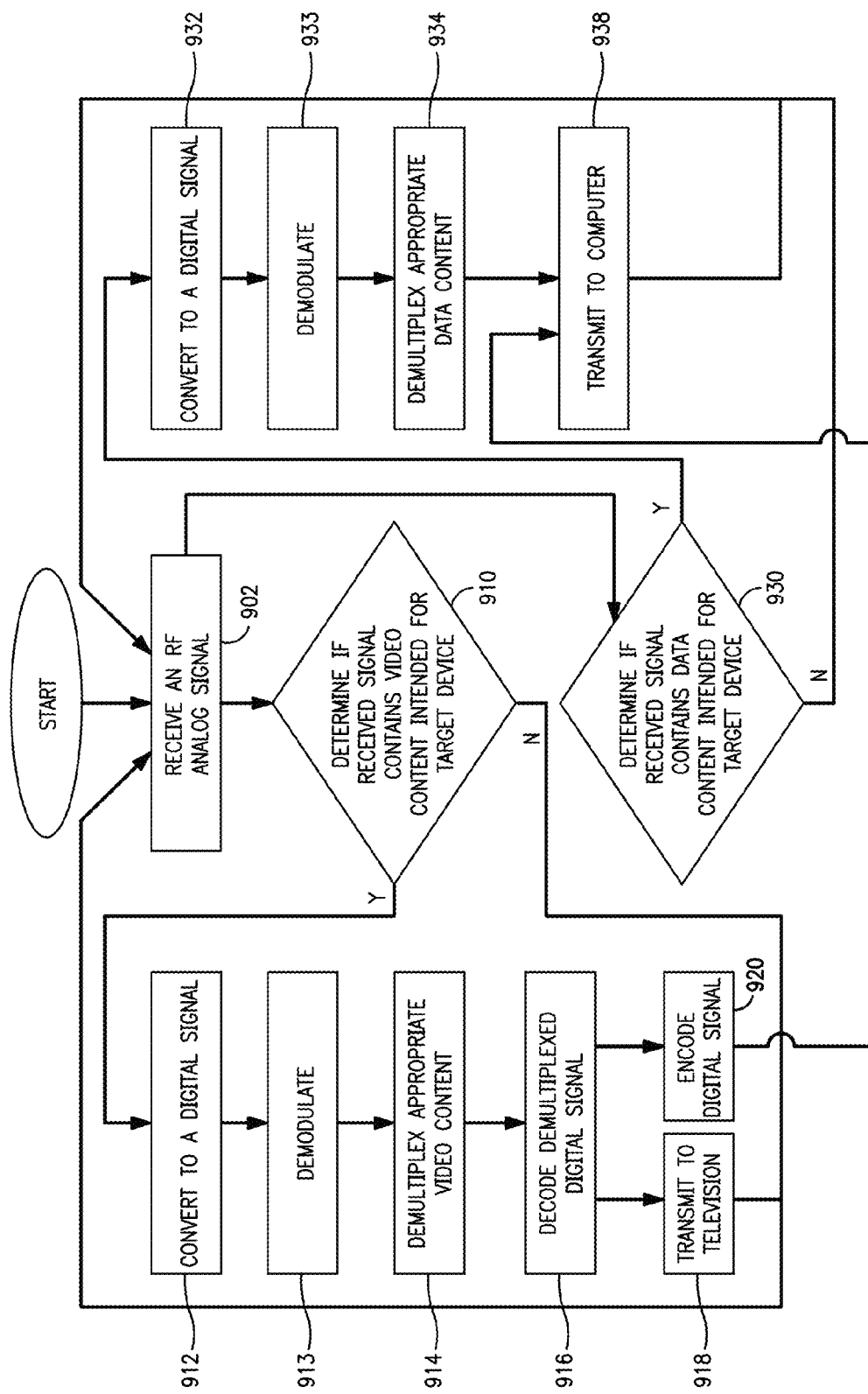
FIG. 9 is a flow diagram of a method used in accordance with a third embodiment of the present invention.
Figure 10:
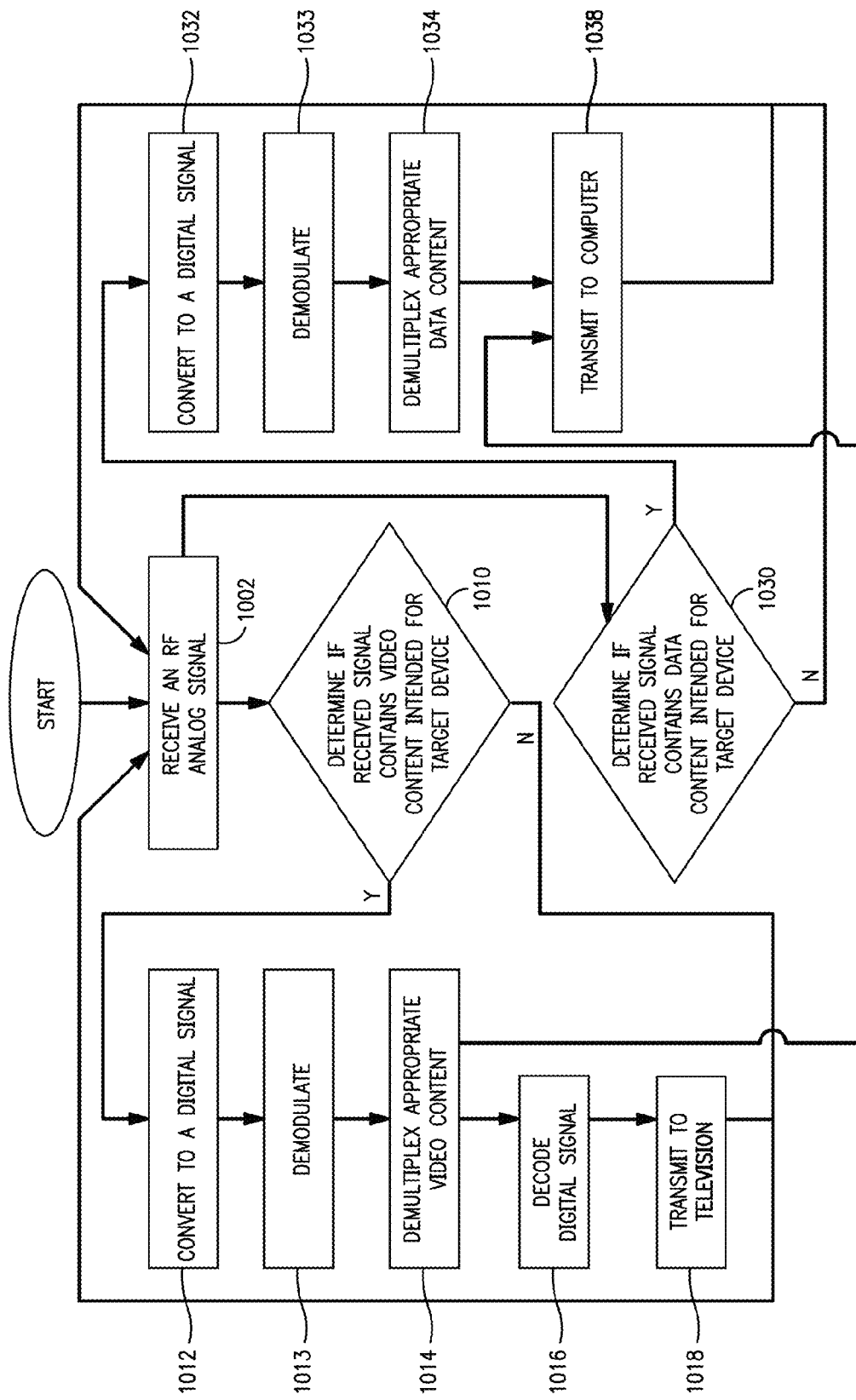
FIG. 10 is a flow diagram of a method used in accordance with a fourth embodiment of the present invention.

Referring now to FIGS. 8-10, exemplary methods of operation for a unified PSG device (i.e., one incorporating both in-band and OOB interface capability within a single device) are described. While such unified device may comprise separate in-band and OOB RF tuners as previously described, it may also comprise a unified or wideband tuner apparatus adapted to receive content from multiple QAMs substantially simultaneously.

As shown in FIG. 8, an RF signal is first received at the unified device per step 802. The received RF signal is typically a multiplexed analog signal comprising: (i) data content adapted to be transmitted to a computer for processing (e.g., IP-over-MPEG), and/or (ii) video content (e.g., MPEG2 encoded video or the like) adapted to be transmitted to a device such as a television or stored on a DVR. The received signal is processed at step 810 to determine whether it contains video content intended for a target device, and also at step 830 to determine whether the received signal contains data content intended for a target device. Note that steps 810 and 830 may not necessarily be performed sequentially as shown, and in fact may be performed in parallel or according to any number of other schemes. Moreover, these steps may be performed after other processing described subsequently herein (e.g., A/D conversion and demultiplexing).

In some embodiments, steps 810 and 830 are performed by one or more tuners, demultiplexer and demodulator stages comprised within a single device (e.g., PSG 200). For example, a cable tuner tuned to a specific program channel (and hence one or more QAMs) indicates that the video or media content corresponding to that program channel is the appropriate video content intended for a target television. Similarly, a DOCSIS tuner by virtue of being tuned to DOCSIS QAM(s), presumes that data received over those channels is intended for data devices (such as a PC). Alternatively, the video and data components may be multiplexed into the same transport stream(s), with e.g., the data in effect acting as just another MPEG-2 encoded program (albeit encapsulating the higher layer IP protocol, and optionally a higher-layer coding such as MPEG or Real as previously described).

As another option, the PSG 200 may use a certain network address (e.g., MAC, IP address, etc.) or network address filter to determine whether data content is intended for a connected computer or another device. This is particularly applicable to the "all IP" variants described with respect to FIG. 6 herein.

If video content intended for a target device (e.g., DVR or television monitor) is discovered, the appropriate video content is converted from analog to digital (e.g., using an ADC) per step 812, and then demodulated (e.g., QAM demodulated for cable, or QPSK for satellite applications) per step 813. The digital demodulated content is then demultiplexed if required at step 814. Other operations may also be performed, such as forward error correction (e.g., Reed-Solomon, Viterbi, low density parity code (LDPC), or Turbo decoding) within the foregoing process.

In one embodiment, the video content is demodulated and demultiplexed for only the currently tuned program channel(s). For example, if the received signal comprises program channel content for a broad range of channels 1-50, and the analog tuner is currently tuned to a frequency corresponding to say program channel 34, then only the data corresponding to program channel 34 is extracted from the multiplexed and modulated signal. In other embodiments, multiple program channels are demodulated/demultiplexed and extracted from the signal as previously described. This latter approach is useful, for example, in a digital video recorder, where multiple program channels are to be viewed and recorded simultaneously via a multi-band or wideband tuner, or other such arrangement.

In most situations, the resulting demultiplexed and demodulated digital signal remains in an encoded format, as digital signals are often encoded by one or more video codecs and/or container formats at the cable headend or other network node before being transmitted as a multiplexed analog signal in step 802. For example, the digital signal may have been encoded with an MPEG-2, Real, or Windows Media encoding scheme. At step 816, the digital signal is then accordingly decoded, and at step 818, the decoded signal is then transmitted to a connected television for display. The method then repeats from step 802. An appropriate digital video encoding (DVE) process may also be applied before transmission to the television or other display device for, e.g. NTSC/PAL, or RGB, or YCbCr conversion and synchronization, as is well known in the art.

Data content is handled in a generally similar fashion. If data content intended for a target device (e.g., PC) is present, the appropriate data content is A/D-converted after receipt from the tuner/coaxial drop (step 832), demodulated (e.g., 64- or 256-QAM or the like for cable, and QPSK for most satellite applications) per step 833, and demultiplexed from the QAM at step 834 if required. As stated above, some embodiments utilize a DOCSIS tuner to receive data content intended for network devices such as PCs or other computerized apparatus, thereby obviating determination of the type of content received per step 830 (i.e., it is presumed to be data content if received over the DOCSIS QAMs).

The signal is then transmitted to a connected computer or other device (e.g., router) for processing at step 838. Such computer-based processing might comprise, for example, compression or coding the decoded content into another format, storage, etc. The process then repeats from step 802.

In one variant, network address translation (NAT) is also performed (translating the source and/or destination addresses of the data content) as required to effect delivery within the premises network. NAT may also be used to allow each of the PCs or other nodes in the premises network to have unique addresses. This prevents multiplication of IP or other network addresses for the premises, which can be expensive for the subscriber.

In another embodiment, the dynamic host control protocol (DHCP) is used for network addressing by the devices on the premises LAN. As is well known, DHCP a protocol used to obtain IP addresses and other parameters such as the default gateway and subnet mask of DNS or other servers, typically from a designated DHCP server.

Figure 8A:
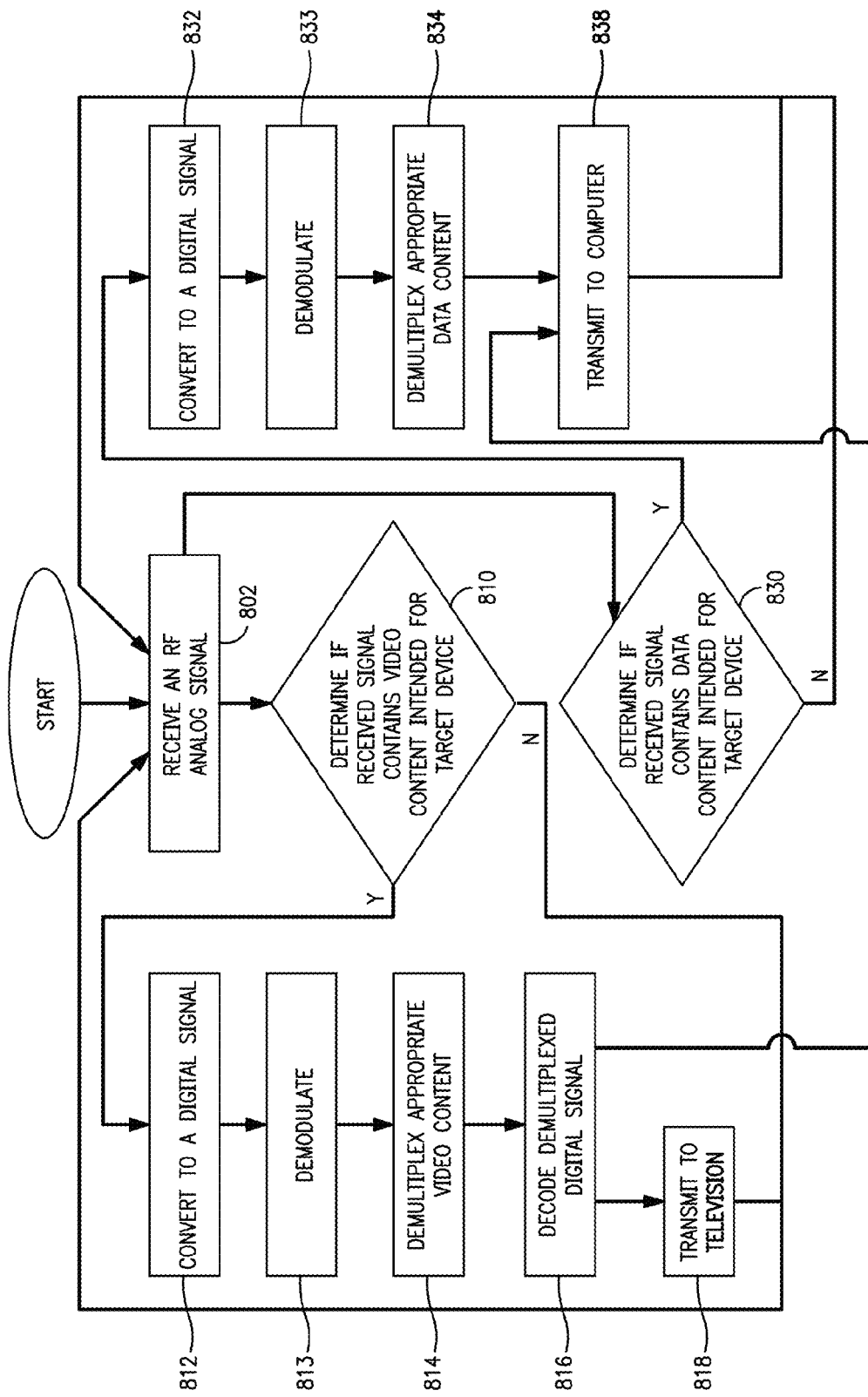

FIG. 8a illustrates a variant of the method illustrated by FIG. 8. Generally speaking, the key difference in this embodiment is that video content may be transmitted to both a target television and a target computer or other computerized device. This enables, inter alia, cable television channels to be streamed to a computerized or other device and displayed on a connected viewing device, such as an LCD monitor. Thus, after the digital signal is decoded in step 816, it is routed both to a television and a computerized device for appropriate processing. For example, this decoding might comprise MPEG-2 decoding, at which point the MPEG-over-IP encoded packets previously described are forwarded to the computer.

FIG. 9 illustrates another variant of the method illustrated by FIG. 8. Here, the digital signal is encoded into a format appropriate for display on a computer monitor before being transmitted to the computer. This occurs at step 920. The computer receiving the encoded digital signal is adapted to handle the encoding scheme accordingly.

FIG. 10 illustrates another variant of the method illustrated by FIG. 8. This variant is similar to the variant shown by FIG. 8a, except that the video content is transmitted to a target computer in its original encoded format (i.e., before being decoded at step 1016). Thus, this variant allows for some of work normally performed by a device such as a PSG 200 to be performed by a computer, provided that the computer has the appropriate codec necessary to decode the transmitted digital signal (and recode it into an appropriate format for display or distribution). This may be, for example, an MPEG-2 or DVB codec.

It should be noted that the above examples are merely exemplary; many other methods and permutations of methods may be realized in accordance with the present invention and consistent within its scope.

Premises Services Gateway Apparatus—

Referring now to FIGS. 11-15, various exemplary configurations of the PSG 200 useful with the topologies shown in FIGS. 2b-6 herein are described in greater detail.

Figure 11:
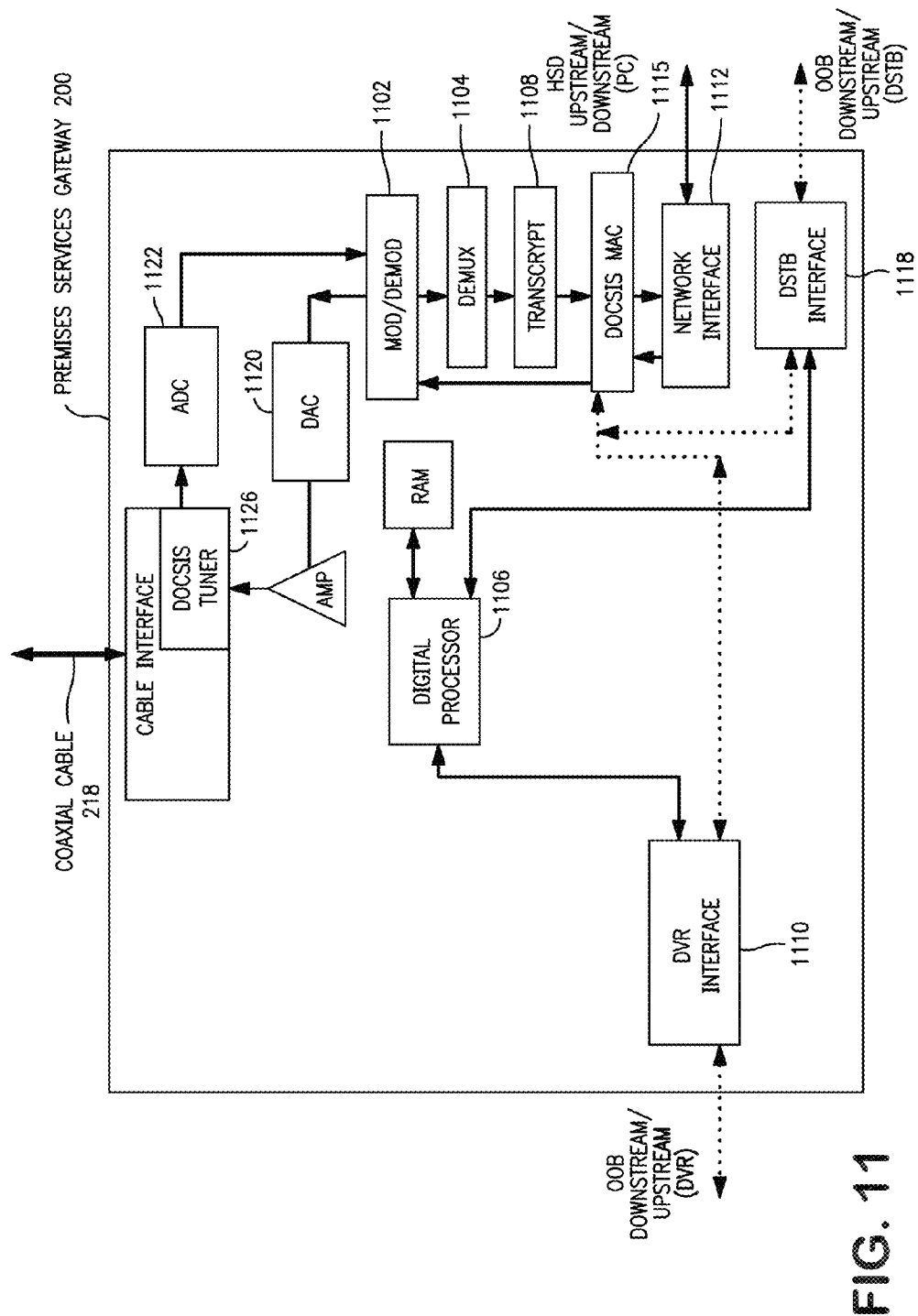
FIG. 11 is a block diagram of a first embodiment of a premises services gateway device according to the invention.

As shown in FIG. 11, a first configuration of PSG 200 comprises a substantially unified device having a coaxial cable interface 218 that is coupled to a DOCSIS tuner 1126. The analog RF signals received over the DOCSIS tuner are A/D converted (ADC 1122), and the digital signals demodulated (e.g., QAM-256 demodulated) using a demodulator 1102, after which the demodulated signals are demultiplexed 1104. An optional transcryption module 1108 adapted to perform security domain transcryption of the type previously described herein is also illustrated in FIG. 11.

A DOCSIS media access controller (MAC) 1115 is used to extract the data for routing over the high-speed network interface 1112, such as to a personal computer (PC). The interface 1112 might comprise, for example, a coaxial cable interface, an Ethernet/GBE interface with RJ-45/CAT-5, a Firewire (IEEE-1394) interface, USB interface, a wireless interface (e.g., WiFi, UWB PAN, etc.), or other.

Upstream DOCSIS signals are sent from the MAC 1115 to the QAM modulator 1102, and then D/A converted 1120, amplified, and sent upstream on an appropriate QAM.

The PSG 200 is also comprised of a DVR interface 1110, which receives OOB signals (dotted lines) from the DVR, and likewise transmits downstream OOB signaling to the DVR. The DVR interface 1110 is in OOB signal communication with the DOCSIS MAC 1115, and is controlled at least in part by the digital processor 1106.

The PSG 200 also includes a DSTB interface 1118, which like the DVR interface 1110, is controlled by the processor 1106, and interfaces OOB signals with the DOCSIS MAC 1115 and an external DSTB.

Hence, in the embodiment of FIG. 11, the PSG 200 acts as an OOB proxy for external DVR and DSTB assets, which each have their own coaxial "in-band" interface (not shown) for delivery of in-band content. This obviates the OOB tuner on each device, thereby allowing them to be simpler and manufactured more inexpensively. In one variant, communication between the various entities (e.g., DVR and DSTB and PSG OOB proxy) is accomplished using IP-based communications of the type well known in the art, although other approaches may be used with equal success.

As noted above, the PSG 200 may also be used to distribute System Information (SI), a type of packet used in a MPEG-2 or Digital Video Broadcast (DVB) streams.

In one embodiment, network interface 1112 acts as a switch or router, and directs data content based on destination IP address headers. For example, the PSG 200 may comprise a plurality of Ethernet ports, one port comprising a connection to a network card located in a first computer, and a second port comprising a connection to a network card located in a second computer. In this variant, a unique IP address is assigned per each network card. Thus, when the interface 1112 reads a packet header indicating the destination IP address of the first or second network card, it routes the data accordingly.

In a second embodiment, the interface 1112 acts as a router comprising a network address translation module and a Dynamic Host Configuration Protocol (DHCP) Server (not shown). The DHCP Server maintains a list of addresses available to assign to networked clients, and assigns these addresses accordingly. The DHCP Server ensures that all IP addresses are unique, that is, that no IP address is assigned to a second client while the first client's assignment is valid. The Network Address Translation module (NAT) is adapted to re-write the source and/or destination addresses of IP packets as they are received from either the networked devices (for packets transmitted upstream) or the data services gateway (for packets transmitted downstream). In some variants, the NAT replaces any assigned network address with the IP address of the interface 1112 as the source IP address for data packets transmitted upstream. The NAT likewise replaces the IP address of the interface 1112 with the appropriate assigned network address as the destination IP address for data transmitted downstream.

Figure 12:
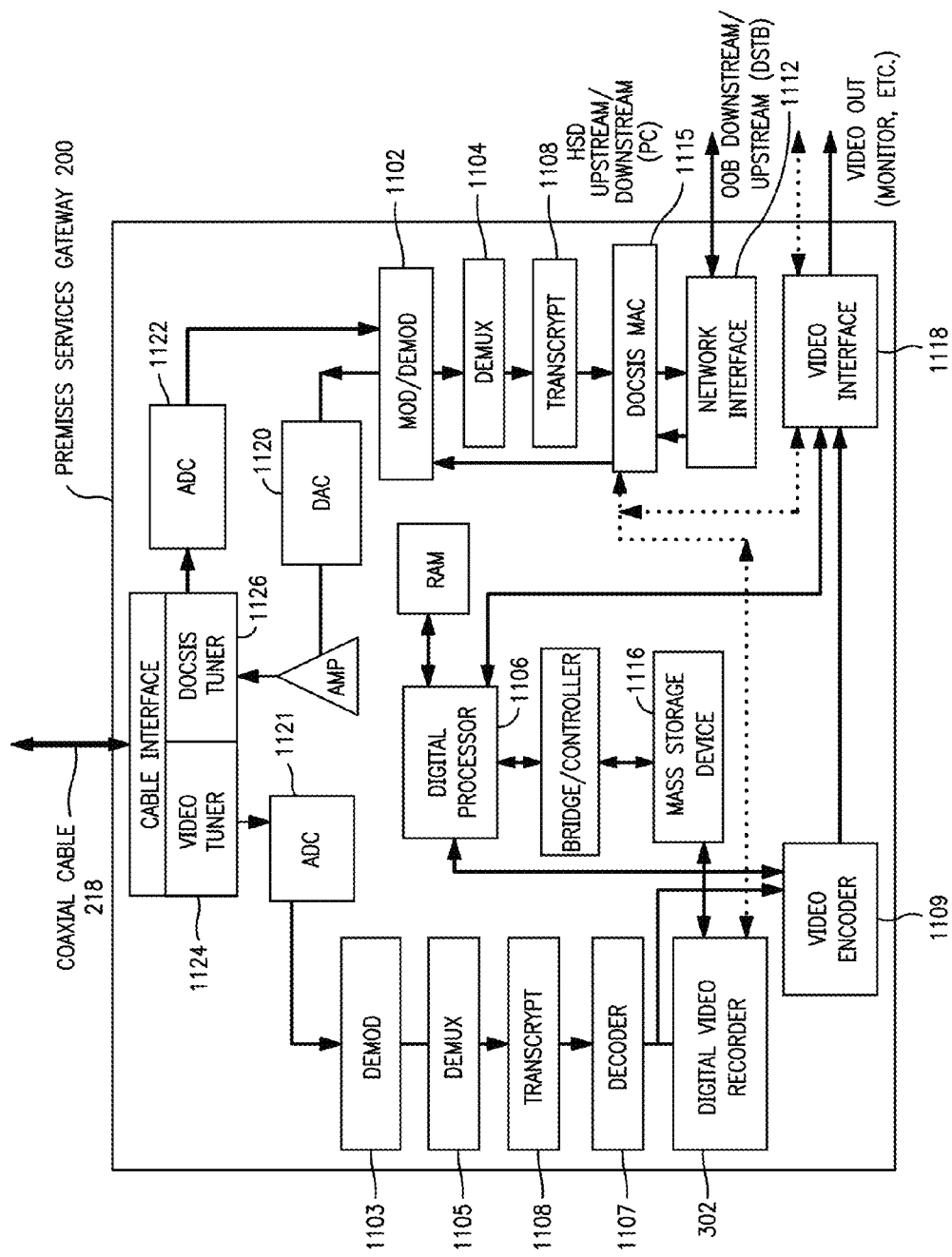
FIG. 12 is a block diagram of a second embodiment of a premises services gateway device according to the invention, comprising integrated digital video recording (DVR) and high-speed data functionality.

FIG. 12 shows an alternate configuration of the PSG 200, wherein the PSG includes both a DOCSIS tuner 1126 and an in-band (e.g., video) tuner 1124. The video tuner 1124 may comprise for example a standard 50-850 MHz "all-digital" tuner to receive broadcast services, although other configurations may be used. The operation of the DOCSIS portion of the device is substantially similar to that previously described for FIG. 11, yet the PSG further includes a video processing pathway (left side of FIG. 12), wherein video signals are demodulated 1103, demultiplexed 1105, transcrypted 1108, decoded 1107 as needed, and then recorded to an indigenous DVR function 302 and associated mass storage device 1116. Video that is to be transmitted outside the gateway 200 is optionally video encoded via the encoder 1109, and then sent to a monitor, etc. via the video interface 1118 as shown.

The DVR 302 uses the OOB functions of the PSG 200 as a proxy (i.e., instead of its own OOB interface), as previously described.

Figure 13:
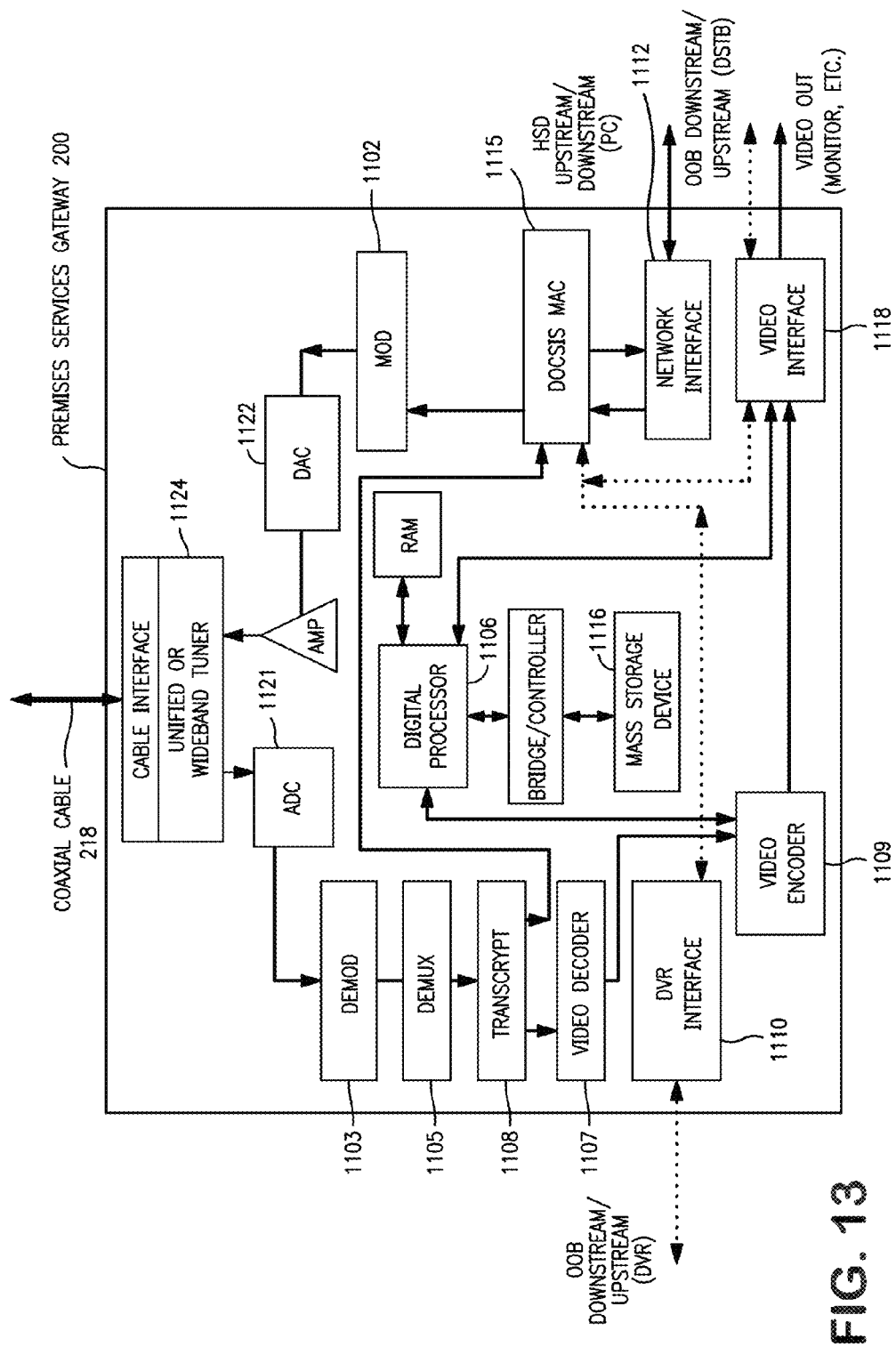
FIG. 13 is a block diagram of a third embodiment of a premises services gateway device according to the invention, comprising a unified or wideband tuner apparatus, and integrated video and high-speed data capability.

Per FIG. 13, yet another embodiment is illustrated, wherein a unified or wideband tuner arrangement 1124 of the type previously referenced herein is used. Here, both downstream in-band (e.g., video) and DOCSIS content are received via the unified tuner 1124, and then demodulated and demultiplexed (and optionally transcrypted 1108) as shown. The demultiplexed/transcrypted video is then decoded, and distributed to e.g., a video encoder 1109 as previously described with respect to FIG. 12. The demuxed DOCSIS data is sent to the DOCSIS MAC 1115, and distributed as previously described (e.g., to a PC or the like) with respect to FIG. 11. A resident mass storage device 1116 (e.g., HDD) is provided in this configuration for e.g., storage of video content, although this is not a requirement.

Figure 14:
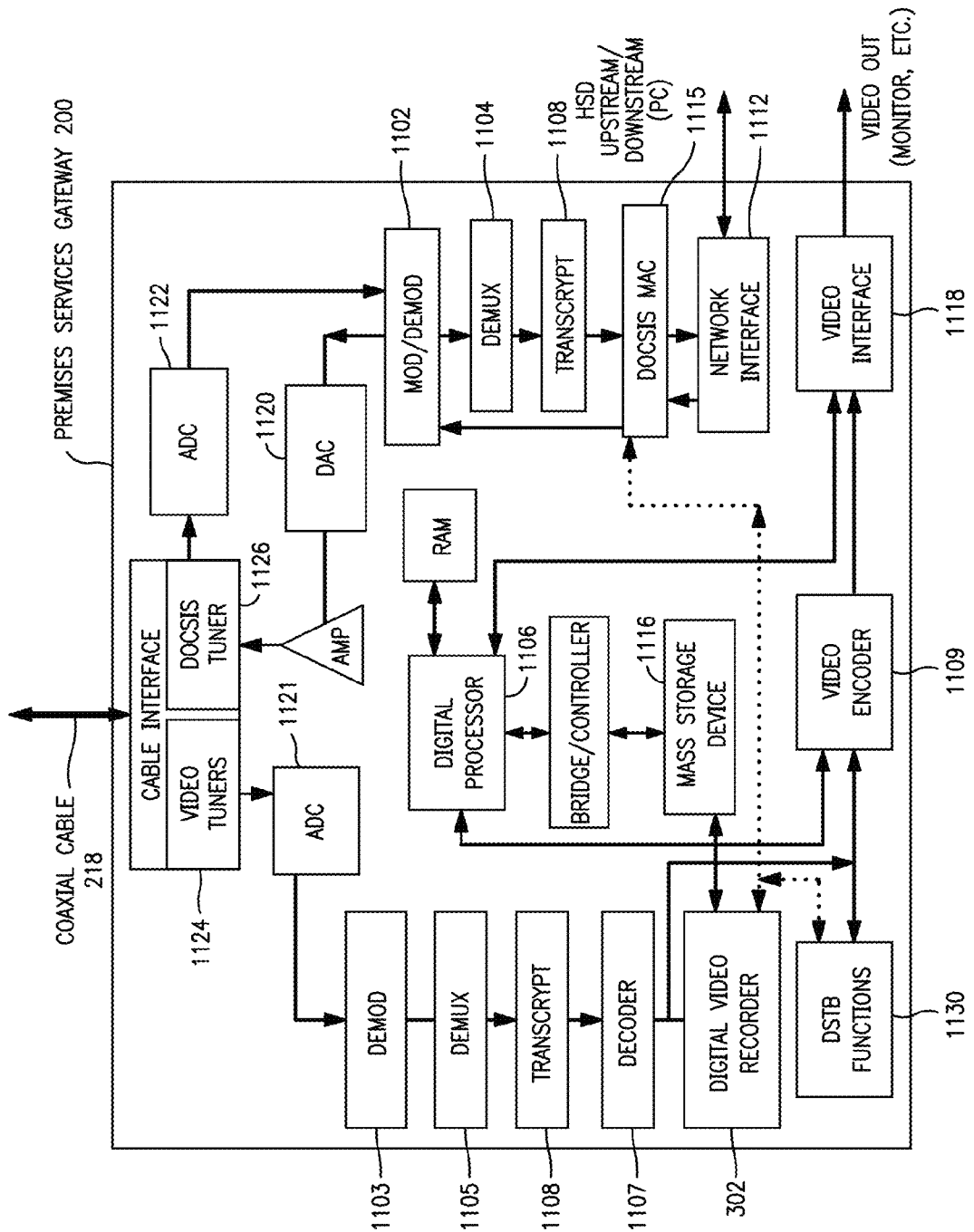
FIG. 14 is a block diagram of a fourth embodiment of a premises services gateway device according to the invention, comprising integrated digital video recording (DVR), digital set-top box (DSTB), and high-speed data functionality.

In the configuration of FIG. 14, the PSG 200 is equipped similarly to the device of FIG. 12, with the exception that an indigenous DSTB function 1130 is provided which uses the PSG's DOCSIS interface as a proxy, as previously described (as does the DVR 302). The DSTB functions 1130 in effect subsume normal DSTB functionality within the PSG, thereby obviating the DSTB altogether. In this fashion, a fully integrated and unified device is present, having one (1) DOCSIS tuner, two (2) or more video or in-band tuners (i.e., to support DVR recording capability and simultaneous viewing of in-band content), one (1) cable drop 218 (to service the DVR, DSTB/in-band viewing, and DOCSIS HSD functions collectively), and hence acts as a DVR, DSTB, and cable modem all in one.

Figure 15:
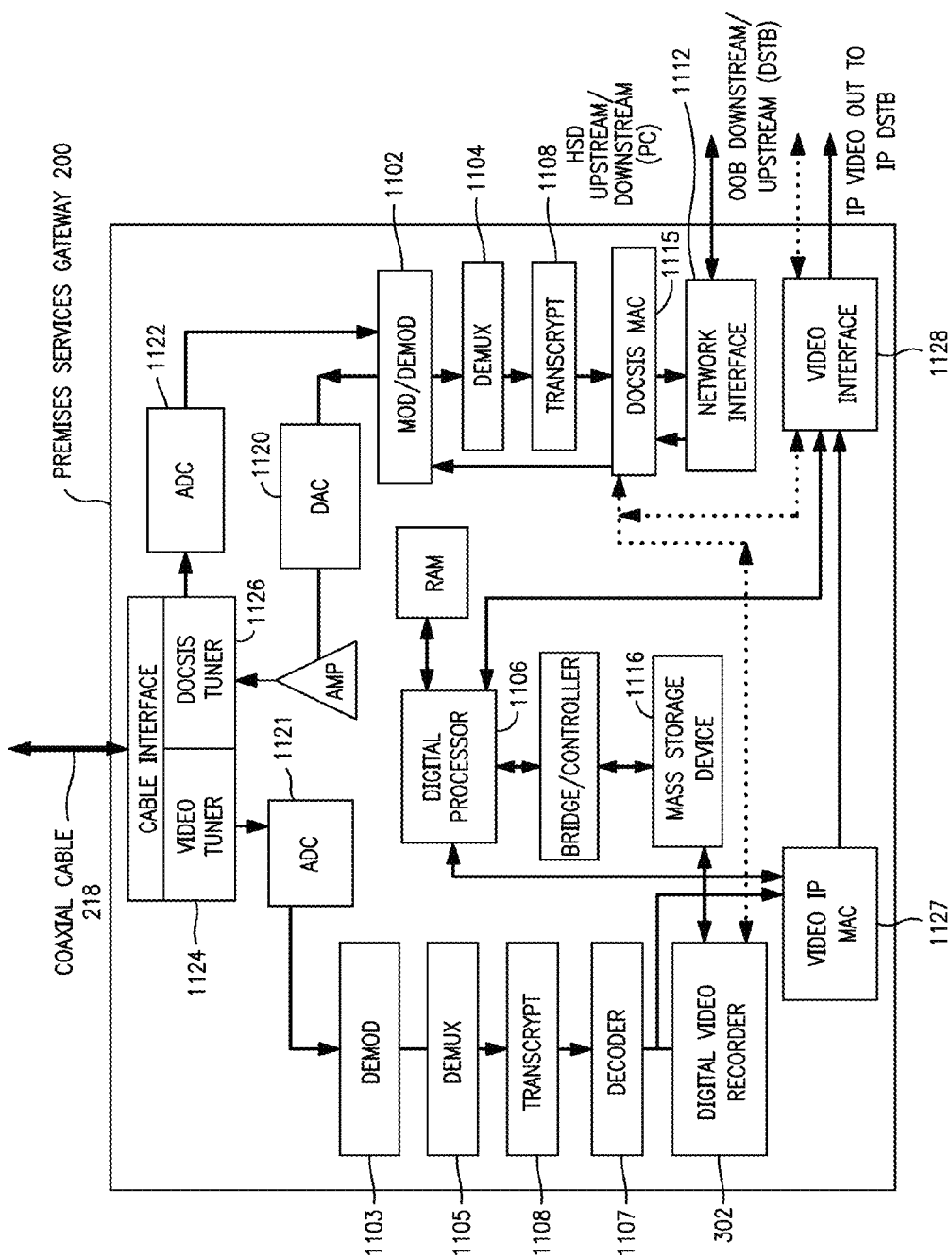
FIG. 15 is a block diagram of a fifth embodiment of a premises services gateway device according to the invention, with integrated DVR and further adapted for IP-based processing and distribution.

FIG. 15 illustrates yet another possible configuration of the PSG 200, wherein while generally similar to the device of FIG. 12, a video IP MAC 1127 is provided, as is an IP STB interface 1128. This "all IP" variant allows servicing of DOCSIS IP and video IP (e.g., "IP TV") functions in a unified fashion, while still maintaining a unified OOB proxy function.

As previously discussed, the PSG 200 may also act as part of a trusted domain (TD) or authorized service domain (TD), and support downloadable conditional access (e.g., DCAS), digital rights management (DRM), and similar functional models. For example, in one variant, the PSG 200 comprises a secure microprocessor (SM), not shown and negotiates with a personalization server (PS) and other network infrastructure in order to obtain a common and personalized software image as would a conventional download-enabled STB.

Moreover, the PSG 200 can be configured to use one or more identifying parameters (e.g., MAC address, TUNER_ID, TUNER_USE, or the like) as the basis for an anonymous identification of the PSG 200 (or even devices on the premises LAN with which the PSG 200 is associated. For example, in one variant, a so called "opaque" variable formed using a one-way cryptographic hash of the aforementioned parameters (or portions thereof), such as that described in co-owned and co-pending U.S. patent application Ser. No. 11/186,452 filed Jul. 20, 2005 and entitled "METHOD AND APPARATUS FOR BOUNDARY-BASED NETWORK OPERATION", incorporated herein by reference in its entirety, is used to uniquely but anonymously identify the PSG 200. Since a DOCSIS MAC is used as the proxy for all other devices (e.g., DVR, STB, etc.), only one opaque variable can be generated if desired, somewhat akin to a single IP address for the IP MAC of the device (with NAT for the LAN-connected premises devices behind the PSG). However, other embodiments where each device (even when integrated into a unified configuration) has its own unique anonymous identifier are also contemplated under the present invention.

The PSG 200 of the present invention may also utilize the content evaluation and peer sourcing technologies described in co-owned U.S. patent application Ser. No. 11/726,095 filed Mar. 20, 2007, entitled "METHODS AND APPARATUS FOR CONTENT DELIVERY AND REPLACEMENT IN A NETWORK", incorporated herein by reference in its entirety. For example, in one such embodiment, the PSG 200 can act as a source or sink peer within a network, so as to inter alia permit bandwidth consumption to be pushed out to the edge of the network (and away from the core). The DVR function 302 of the embodiment of FIG. 12 herein, for instance, might include a client process adapted to evaluate downloaded and stored content, and transparently request defective or corrupted portions of this content from peer devices on the network that have the requisite content.

In yet other variants, the PSG 200 of the present invention may include transcoding, transcrypting, or transrating functionality. Essentially, a transcoder receives a signal encoded in one format, translates the signal into a signal encoded in another format, and transmits or stores the translated signal. This is useful because a variety of standards and compression schemes are currently being employed to encode remote content. Thus, transcoder can be used, inter alia, for converting unreadable content into a readable format for a given client device. For example, this allows the PSG 200 to translate video content encoded in a format appropriate for television viewing into a format which can be read and processed by a client computer, and vice versa.

The exemplary transcrypter module (not shown) provides translation of security data or protection mechanisms between different environments or domains (e.g., between a conditional access domain resident on the cable television network), and a Digital Rights Management (DRM) scheme resident on e.g., an IP-based computer resident on the premises LAN connected to the PSG 200. In this fashion, content or other data within the cable environment can "jump the fence" to DRM or other security environments that may be more widely deployed on IP-based devices for example. This is particularly useful for the "all IP" embodiments previously described herein with respect to FIGS. 6 and 15.

Business Models—

In another aspect of the invention, the aforementioned apparatus and methods can be used as the basis for one or more business models.

As previously discussed, various embodiments of the invention advantageously reduce capital costs associated with CPE and infrastructure, such as by eliminating costs associated with tuners for these devices (e.g., on the order of $20 USD per cable modem, and $10-$40 USD per tuner). The invention may also be used to obviate multiple CableCards or other conditional access mechanisms within a given premises, which not only saves costs but also allows for a more unified CA implementation.

For example, in one embodiment, the network operator (e.g., MSO of a cable network) can use the OOB proxy capabilities described herein as a basis for reducing the cost of deploying CPE within the subscriber's premises. Instead of providing a DVR or STB with both video and OOB tuners and processing, the MSO might provide the subscriber with a PSG which obviates the need for separate OOB tuning and support in the DVR and/or STB. This also potentially simplifies communication infrastructure at the headend, since the headend OOB communications process need only interface with a single communication entity (i.e., the OOB apparatus in the PSG, which acts as a proxy for the other devices).

In another variant, the MSO provides the subscriber with a unified or converged device 400 of the type previously described. The CD includes indigenous high speed data (e.g., DOCSIS cable modem) capability, and hence can act as an OOB proxy in all cases. This allows the MSO (or the subscriber) to provide STB and DVR devices that do not have OOB tuners and supporting components, and hence cost less. The distribution of the CD may be done to all subscribers (e.g., whether they have subscribed for high speed data services or not) so as to simplify stocking, delivery installation, and configuration processes by the MSO ("one size fits all" approach of sorts), or alternatively in a more selective fashion; e.g., to only subscribers that need high speed data capability.

As another option, the MSO or another entity can selling or provide services that are licensed on a per-dwelling or per-unit basis, somewhat akin to prior art software "site" licensing approaches. Such an approach is also advantageously expandable, such as more DVRs, PCs, STBs, etc. are added to a particular premises or installation.

In another variant, an embedded multimedia terminal adapter (eMTA) of the type previously described herein is included within the PSG 200 or CD for inter alia digital telephony functions, thereby further reducing and consolidating capital costs. Embedded multimedia terminal adapters (eMTAs) offer significant revenue opportunities for MSOs by combining delivery of high-speed data with VoIP services by connecting legacy telephony and terminal equipment (such as a fax machine) to an MSO's IP network. Traditional telephone functions such as call waiting, 3-way calling, voice mail and fax are supported.

In yet another embodiment, the PSG 200 can be used to host or receive service or other applications. For example, an application with a particular service or maintenance functionality can be downloaded top the PSG (or a designated proxy device, such as the aforementioned PC) and run as needed to provide the necessary functions. This application can then stay resident (dormant) on the PSG or PC, be destroyed upon completion of its function, and so forth. The application might be used for example to collect polling or sample data from one or more devices within the premises network, monitor PSG functions, initiate communications with other devices (e.g., as a local communications proxy according to a prescribed communications or data transfer protocol), etc.

Similarly, the PSG 200 or a designated proxy thereof can be used as a "Point of Presence" (PoP) for the network operator; e.g., a chat, text, audio, etc. interactive user interface, which allows for real-time interactive communication between the operator (e.g., MSO) and the user. Such functionality may be useful, for example, where the user requires "on line" or real time help with finding or activating a service, troubleshooting, subscription package changes, movie downloads, and the like.

The PSG 200 may also be used as part of a peer-to-peer (P2P) network for, inter alia, content sharing or replacement, such as that described in co-owned U.S. patent application Ser. No. 11/726,095 filed Mar. 20, 2007 previously incorporated herein by reference in its entirety. Other P2P approaches may be used as well consistent with the aim of having the PSG or a designated proxy communicate with other CPE on the network.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A premises gateway apparatus located at a first location proximate a user for use with a content distribution network, said apparatus comprising:
   a first tuner configured to receive in-band signals from said network, and obtain first data from said in-band signals, said first data comprising first Internet Protocol (IP) packets;
   a second tuner configured to receive out-of-band signals from said network, and obtain second data from said out-of-band signals, said second data comprising second IP packets;
   a multiplexer, configured to multiplex said first data and said second data to form third signals; and
   an interface configured to:
      format said third signals; and
      distribute said formatted signals to a plurality of consumer premises devices in data communication with said gateway apparatus.

2. The gateway apparatus of claim 1, wherein said network comprises a cable television network, and said in-band signals are delivered over said network associated with in-band Quadrature Amplitude Modulations (QAM).

3. The gateway apparatus of claim 2, wherein said out-of-band signals are delivered over said network associated with out-of-band QAMs.

4. The gateway apparatus of claim 3, wherein said interface comprises a Transmission Control Protocol (TCP) transport layer protocol and an IP network layer protocol, and said plurality of consumer premises devices comprises a personal computer.

5. The gateway apparatus of claim 3, wherein said plurality of consumer premises devices comprises an IP-enabled digital set-top box.

6. The gateway apparatus of claim 5, wherein said second tuner is further configured to transmit out-of-band signals over said network to a distant entity.

7. The gateway apparatus of claim 6, wherein said transmitted out-of-band signals comprise signals originated from said digital set-top box.

8. A premises gateway apparatus located at a first location proximate a user for use with a content delivery network, said apparatus comprising:
   a tuner configured to:
      receive in-band signals from said network comprising a Moving Picture Experts Group (MPEG) transport stream;
      obtain first data from said in-band signals;

receive out-of-band signals from said network comprising an MPEG transport stream encapsulated in Internet Protocol (IP) packets, said out-of-band signals identified as intended for a first one of a plurality of consumer premises devices in communication with said premises gateway apparatus located at said first location proximate a user; and obtain second data from said out-of-band signals;

a first interface configured to demultiplex and format said first data according to a protocol, and distribute said formatted first data to said plurality of consumer premises devices in data communication with said gateway apparatus; and a second interface configured to demultiplex and at least distribute said second data to said first one of said plurality of consumer premises devices in data communication with said gateway apparatus located at said first location proximate a user.

9. The gateway apparatus of claim 8, wherein said network comprises a cable television network, and said in-band signals are delivered over said network associated with in-band Quadrature Amplitude Modulations (QAM).

10. The gateway apparatus of claim 9, wherein said out-of-band signals are delivered over said network associated with out-of-band QAMs.

11. The gateway apparatus of claim 10, wherein said at least one first premises device comprises an IP-enabled digital set-top box.

12. The gateway apparatus of claim 11, wherein said tuner apparatus is further adapted to transmit out-of-band signals over said network to a distant entity.

13. The gateway apparatus of claim 12, wherein said transmitted out-of-band signals comprise signals originated from said IP-enabled digital set-top box.

14. A method of operating a premises gateway apparatus, said method comprising:

receiving in-band signals via a first tuner from said network;

obtaining first data from said in-band signals, said first data comprising first Internet Protocol (IP) packets;

receiving out-of-band signals, via a second tuner, from said network;

obtaining second data from said out-of-band signals, said second data comprising second IP packets;

multiplexing said first data and said second data to form third signals;

formatting said third signals; and distributing, via an interface, said formatted signals to a plurality of consumer premises devices in data communication with said gateway apparatus.

15. The gateway apparatus of claim 14, wherein said network comprises a cable television network, and said in-band signals are delivered over said network associated with in-band Quadrature Amplitude Modulations (QAM).

16. The gateway apparatus of claim 15, wherein said out-of-band signals are delivered over said network associated with out-of-band QAMs.

17. The gateway apparatus of claim 16, wherein said interface comprises a Transmission Control Protocol (TCP) transport layer protocol and an IP network layer protocol, and said plurality of consumer premises devices comprises a personal computer.

18. The gateway apparatus of claim 16, wherein said plurality of consumer premises devices comprise at least one IP-enabled digital set-top box.

19. The gateway apparatus of claim 18, wherein said second tuner is further configured to transmit out-of-band signals over said network to a distant entity.

20. The gateway apparatus of claim 18, wherein said transmitted out-of-band signals comprise signals originated from said digital set-top box.

* * * * *